United States Patent
Kim

(10) Patent No.: US 9,413,185 B2
(45) Date of Patent: Aug. 9, 2016

(54) ENERGY STORAGE DEVICE AND METHOD FOR CONTROLLING THE SAME

(71) Applicant: LG Electronics Inc., Seoul (KR)

(72) Inventor: Sanghun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 467 days.

(21) Appl. No.: 13/837,502

(22) Filed: Mar. 15, 2013

(65) Prior Publication Data

US 2013/0307479 A1    Nov. 21, 2013

(30) Foreign Application Priority Data

May 16, 2012    (KR) .................... 10-2012-0051990

(51) Int. Cl.
| | |
|---|---|
| *H02J 7/00* | (2006.01) |
| *H02J 3/32* | (2006.01) |
| *H02J 3/38* | (2006.01) |
| *H02J 7/35* | (2006.01) |

(52) U.S. Cl.
CPC .............. *H02J 7/007* (2013.01); *H02J 7/0014* (2013.01); *H02J 7/0022* (2013.01); *H02J 3/32* (2013.01); *H02J 3/383* (2013.01); *H02J 7/35* (2013.01); *Y02E 10/563* (2013.01); *Y02E 10/566* (2013.01)

(58) Field of Classification Search
CPC ........................................................ H02J 7/00
USPC ........................................................ 320/116
See application file for complete search history.

(56) References Cited

U.S. PATENT DOCUMENTS

| | | | | |
|---|---|---|---|---|
| 6,104,163 | A  * | 8/2000 | Komatsu et al. | ............... 320/116 |
| 6,784,641 | B2 * | 8/2004 | Sakai | ....................... H02J 9/061 |
| | | | | 320/130 |
| 6,803,745 | B2 * | 10/2004 | Nishida et al. | ................. 320/112 |
| 2011/0148360 | A1 * | 6/2011 | Lee | ................................ 320/134 |
| 2011/0175565 | A1 * | 7/2011 | Lee | ................................ 320/101 |
| 2012/0086399 | A1 * | 4/2012 | Choi | .............................. 320/116 |

FOREIGN PATENT DOCUMENTS

| | | |
|---|---|---|
| EP | 2418754 A2 | 2/2012 |
| JP | H05-211728 | 8/1993 |
| JP | H10-341535 | 12/1998 |
| JP | 2005-323483 | 11/2005 |
| JP | 2006247821 A | 9/2006 |
| JP | 2008-148463 | 6/2008 |
| JP | 3153468 U | 8/2009 |
| JP | 201093953 A | 4/2010 |

(Continued)

*Primary Examiner* — Samuel Berhanu
*Assistant Examiner* — Tessema Kebede
(74) *Attorney, Agent, or Firm* — Dentons US LLP

(57) ABSTRACT

An energy storage device and methods for controlling the same are disclosed. The energy storage device can include a connector to or from which at least one battery pack is attached or detached, a power converter that converts external input power into DC power in a charge mode, and a switching unit that performs a switching operation such that the DC power converted by the power converter is charged in a first battery pack attached to the connector in the charge mode. Energy storage device can also include a controller that controls the switching unit to turn off electrical connections between the energy storage device and the first battery pack and a second battery pack for a predetermined off period when the first and second battery packs are attached to the connector. Accordingly, when a battery pack is attached or detached, a surge of inrush current may be reduced.

21 Claims, 21 Drawing Sheets

(56) References Cited

FOREIGN PATENT DOCUMENTS

| | | |
|---|---|---|
| JP | 2010-141970 | 6/2010 |
| JP | 2010183829 A | 8/2010 |
| JP | 2010-233287 | 10/2010 |
| JP | 2010233287 A | 10/2010 |
| JP | 2011205866 A | 10/2011 |
| KR | 10-2011-0073635 | 6/2011 |
| KR | 10-2012-0036490 | 4/2012 |
| WO | 2010116540 A1 | 10/2010 |
| WO | 2012/043723 A1 | 2/2012 |

\* cited by examiner

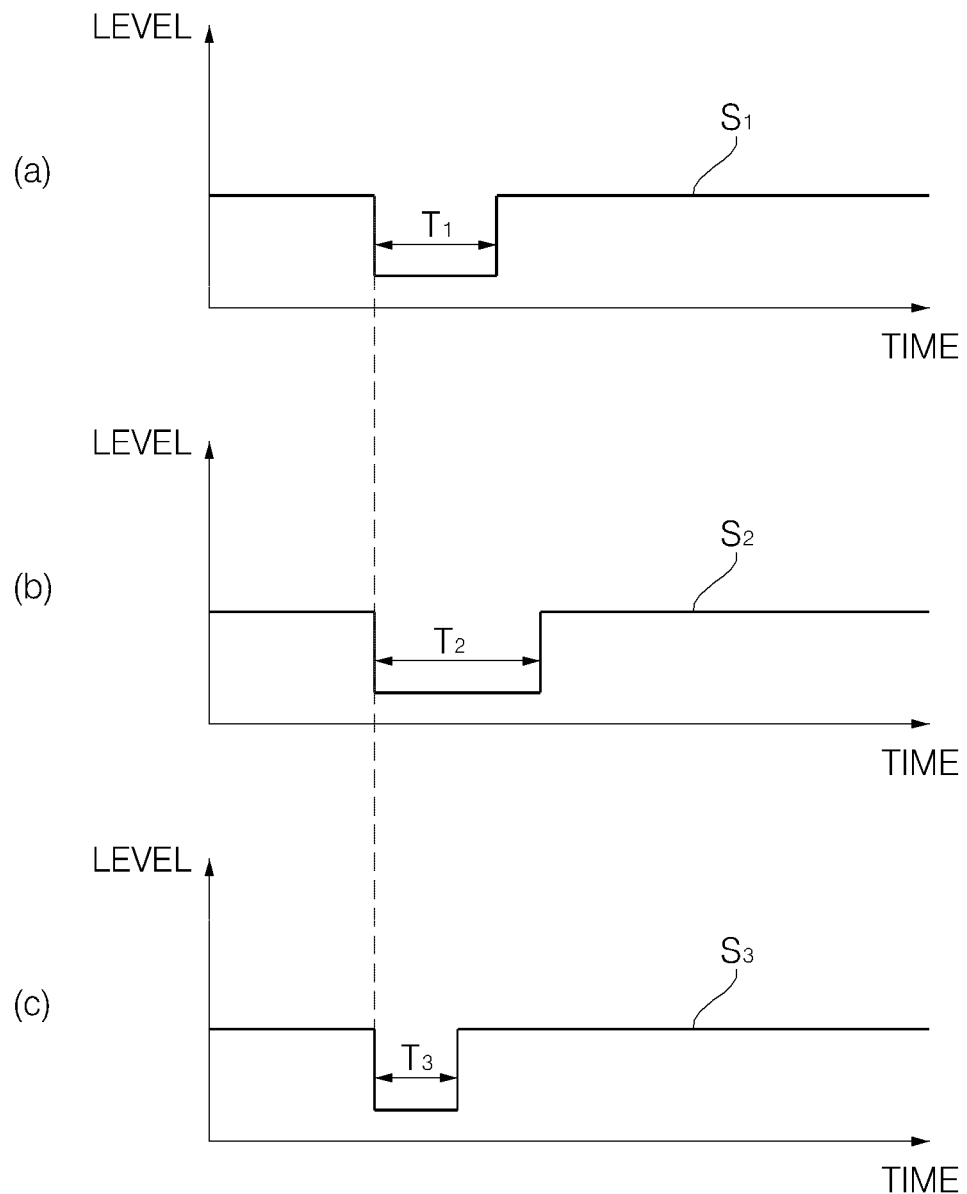

ENERGY STORAGE DEVICE AND METHOD FOR CONTROLLING THE SAME

CROSS-REFERENCE TO RELATED APPLICATIONS

This application claims priority to Korean Patent Application No. 10-2012-0051990, filed on May 16, 2012 in the Korean Intellectual Property Office, which is hereby incorporated by reference as if fully set forth herein.

BACKGROUND

1. Field

The present disclosure relates to energy storage devices, control systems, and methods. More specifically, the present disclosure relates to energy storage devices, control systems, and methods which are capable of reducing inrush current when a battery pack is attached or detached.

2. Discussion of the Related Art

Fossil fuels, or non-renewable energy resources, such as petroleum and coal are depleting at an increasing rate. As a result, interest in alternative or renewable energy sources, including sunlight (i.e., solar power), wind, hydraulic, etc. is on the rise.

SUMMARY

Unfortunately, devices for storing and methods of controlling energy generated from alternative energy sources have many shortcomings. For example, there is a lack of a device and control system that reliably supplies or stores energy made from renewable energy sources. Accordingly, an energy storage device which is capable of reducing a spike of inrush current when a battery pack is attached or detached, and a method for controlling the same is disclosed. Although the disclosed devices and methods are particularly well-suited for renewable energy sources, they may also be applied to non-renewable energy resources.

In an illustrative embodiment, an energy storage device is provisioned. The energy storage device can include a connector to or from which at least one battery pack is attached or detached and a power converter that converts external input power into direct current (DC) power in a charge mode. In addition, energy storage device may include a switching unit configured to perform a switching operation that charges a first battery pack with the DC power converted by the power converter. The first battery pack may be attached to the connector in the charge mode. Energy storage device can also include a controller configured to control the switching unit to turn off electrical connections between the energy storage device and the first battery pack and a second battery pack for a predetermined off period when the second battery pack is attached to the connector under a condition that the first battery pack is attached.

In some embodiments, a method for controlling an energy storage device to or from which at least one battery pack is attachable or detachable is disclosed. The method can include converting external input power into direct current (DC) power and charging the converted DC power in a first battery pack attached to the energy storage device. In addition, the method may further comprise turning off electrical connections between the energy storage device and the first battery pack and a second battery pack for a predetermined off period when the second battery pack is attached to the energy storage device.

In an embodiment a method for controlling an energy storage device to or from which at least one battery pack is attachable or detachable is disclosed. The method can include receiving direct current (DC) power from a first battery pack attached to the energy storage device, converting the DC power received from the first battery pack, and externally outputting a result of the conversion. The method can further include turning off electrical connections between the energy storage device and the first battery pack and a second battery pack for a predetermined off period when the second battery pack is attached to the energy storage device.

Advantages and features of the disclosure in part may become apparent in the description that follows and in part may become apparent to those having ordinary skill in the art upon examination of the following or may be learned from practice of the disclosure. The advantages and features of embodiments of the present disclosure may be realized and attained by the structures and processes described in the written description, the claims, and in the appended drawings.

It is to be understood that both the foregoing general description and the following detailed description are exemplary and explanatory and should not be construed as limiting the scope of the claims.

BRIEF DESCRIPTION OF THE DRAWINGS

The accompanying drawings are included to provide a further understanding of the disclosure, and are incorporated herein and constitute a part of this application. The drawings together with the description serve to explain exemplary embodiments of the present disclosure. Wherever possible, the same reference numbers will be used throughout the drawings to refer to the same or like parts. In the drawings:

FIGS. 10A-D and 11A-C illustrate views referred to for description of the control method of FIG. 9, according to an embodiment of the disclosure;

DETAILED DESCRIPTION OF THE ILLUSTRATED EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

It should be noted that the suffixes of constituent elements used in the following description, such as "module" and "unit," are used for ease of writing this specification and do not have any particular importance or role. Accordingly, the terms "module" and "unit" may be used interchangeably.

Figure 1:
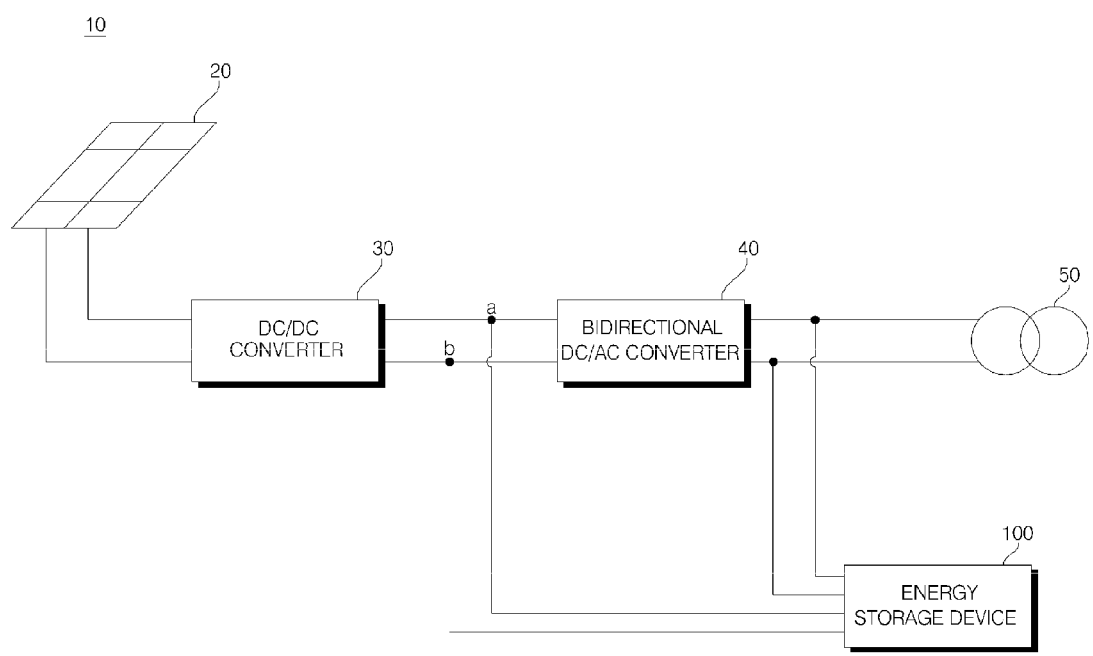
FIG. 1 illustrates a schematic view showing the configuration of an energy supply system, according to an embodiment of the disclosure.

FIG. 1 illustrates a schematic view showing the configuration of an energy supply system 10. Referring to FIG. 1, energy supply system 10 may be a sunlight-based energy supply system. As shown, energy supply system 10 may include a photovoltaic module 20, a DC/DC converter 30, a bidirectional DC/AC converter 40, and an energy storage device 100.

Photovoltaic module 20 can convert sunlight into direct current (DC) power and output the converted DC power. The photovoltaic module 20 may include a solar cell module (not shown), and a junction box (not shown) disposed at one side of the solar cell module. The solar cell module (not shown) may include a plurality of solar cells (not shown). Also, the solar cell module may further include a first sealing member (not shown) disposed on the bottom of the solar cells, a second sealing member (not shown) disposed on the top of the solar cells, a rear substrate (not shown) disposed on the lower surface of the first sealing member, and a front substrate (not shown) disposed on the upper surface of the second sealing member.

Each solar cell can be a semiconductor device which converts solar energy into electrical energy, and may be a silicon solar cell, a compound semiconductor solar cell, a tandem solar cell, a fuel sensitive solar cell, a CdTe solar cell or a CIGS solar cell. The solar cells may be electrically connected in series, in parallel or in series-parallel.

The DC/DC converter 30 converts the level of DC power output from the photovoltaic module 20 and outputs the level-converted DC power. DC/DC converter 30 may include a switch and an energy storage element (e.g., an inductor or a capacitor), and convert the level of DC power to be output, by a switching operation, and output DC power of the converted level. DC/DC converter 30 may be a buck converter, a flyback converter, a boost converter, a forward converter or a combination thereof (e.g., a cascaded buck-boost converter).

In an embodiment, the DC/DC converter 30 may operate according to a maximum power detection algorithm such that maximum power is output from the photovoltaic module 20. For example, the DC/DC converter 30 may calculate power by voltages while decreasing an open-circuit voltage Voc of the photovoltaic module 20 from a maximum voltage V1, and perform a switching operation such that the calculated power becomes the maximum power.

Bidirectional DC/AC converter 40 may convert DC power from the DC/DC converter 30 into alternating current (AC) power and supply the converted AC power to a grid 50, or convert AC power from the grid 50 into DC power and supply the converted DC power to a DC stage a-b or the DC/DC converter 30. To this end, bidirectional DC/AC converter 40 may include a plurality of switches.

In some embodiments, when the bidirectional DC/AC converter 40 is implemented with a full-bridge inverter, an upper-arm switch and a lower-arm switch connected in series may be paired, and a total of two pairs of upper-arm and lower-arm switches may be connected in parallel. Also, a diode may be connected to each switch in inverse parallel. The bidirectional DC/AC converter 40 can preferably be controlled to have the same AC frequency (about 60 Hz) and phase as those of the grid 50 to supply AC power to the grid 50.

The energy storage device 100 may receive and store AC power from the grid 50, DC power output from the DC/DC converter 30 or DC power at the DC stage a-b. Also, the energy storage device 100 may convert the level of DC power stored therein and supply the level-converted DC power to the DC stage a-b, or convert the stored DC power into AC power and supply the converted AC power to the grid 50. To this end, the energy storage device 100 may include a power converter, a controller, and one or more battery packs.

A plurality of battery packs can preferably be attached to the energy storage device 100 and can store varying levels of DC power. The plurality of battery packs may be detachable from energy storage device 100. The power converter may convert input AC power into DC power or convert the level of input DC power. The converted DC power is transferred to the battery pack(s). Alternatively, the power converter may convert the level of DC power stored in the battery pack(s) or convert the DC power stored in the battery pack(s) into AC power.

Although the energy storage device 100 will be described in further detail with reference to other figures later, briefly, the energy storage device 100 includes a controller that can control the entire operation of the energy storage device 100. In addition, the battery pack(s) include a plurality of battery cells that may be attached or detached to or from the energy storage device 100. The energy storage device 100 may be used in various fields, as well as in a sunlight-based energy supply system. For example, the energy storage device 100 may be used in new and renewable energy supply systems using wind power, hydraulic power, etc. In a field where DC power is used, such as a hybrid electric vehicle (HEV) or electric vehicle (EV) system, the energy storage device 100 may be used for the storage of energy.

Figure 2:
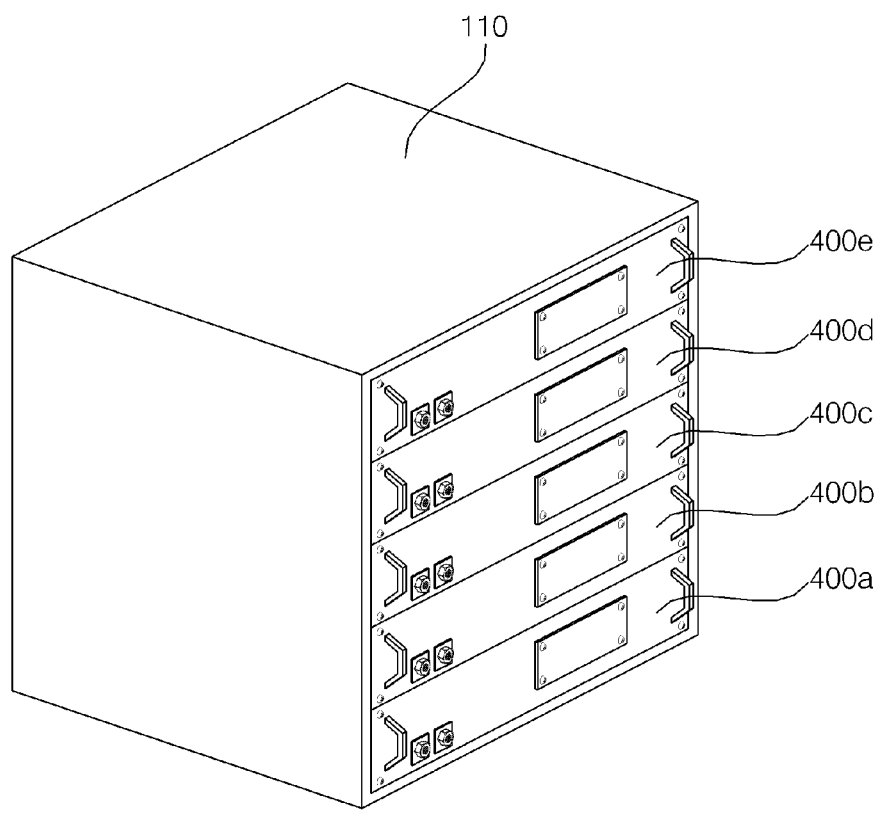
FIG. 2 illustrates a perspective view showing an embodiment of an energy storage device in FIG. 1, according to an embodiment of the disclosure.
Figure 3:
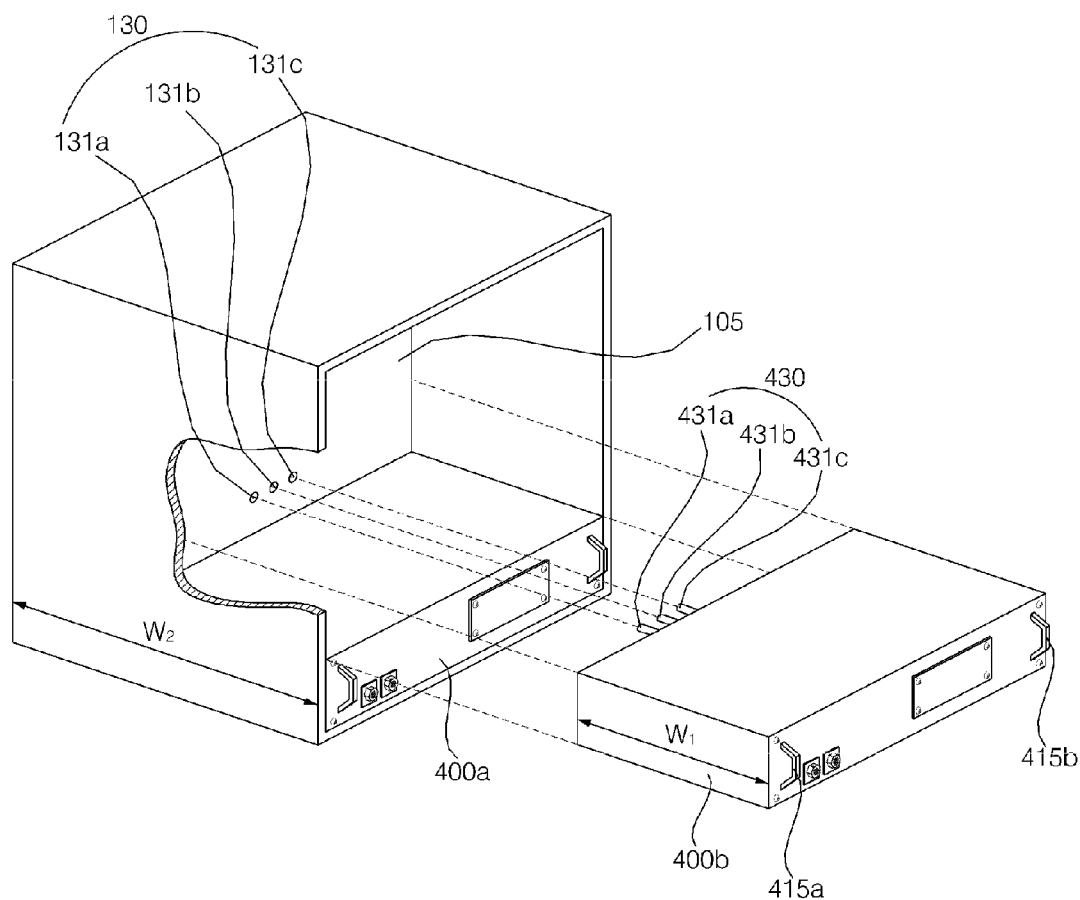
FIG. 3 illustrates a perspective view showing the attachment of a battery pack to the energy storage device of FIG. 2, according to an embodiment of the disclosure.

FIG. 2 depicts a perspective view showing an embodiment of the energy storage device in FIG. 1, and FIG. 3 is a perspective view showing the attachment of a battery pack to the energy storage device of FIG. 2. Referring to FIGS. 2 and 3, the energy storage device 100 may include a case 110 having a hexahedral shape and opened at one side thereof, and a connector 130 coupled with the connection terminals of each battery pack. The case 110 may have a rectangular or cube-like integral structure, and include a hole formed at the side 105 of the energy storage device 100. As a result, a plurality of battery packs 400a, ..., 400e may be coupled with the energy storage device 100 at the side 105 thereof.

The connector 130 may have a hinge structure such that it is coupled with connection terminals of each of the battery packs 400a, ..., 400e. In FIG. 3, the connector 130 is illustrated as including a positive power connection terminal 131a, a negative power connection terminal 131b, and a control signal connection terminal 131c hinged such that they are coupled with a positive power terminal 431a, negative power terminal 431b and control signal terminal 431c of the second battery pack 400b, respectively.

Knobs may be formed at the front side of each of the battery packs 400a, ..., 400e in order to readily attach or detach a corresponding one of the battery packs 400a, ..., 400e to or from the energy storage device 100. In FIG. 3, knobs 415a and 415b are illustrated as being formed in the second battery pack 400b.

In FIG. 3, the second battery pack 400b is illustrated as being attached on the first battery pack 400a under the condition that the first battery pack 400a is attached to the energy storage device 100 at the lowermost end of the side 105 of the energy storage device 100. When the user pushes the second battery pack 400b into the energy storage device 100 at the side 105 thereof with the knobs 415a and 415b of the second battery pack 400b held by him, the positive power terminal 431a, negative power terminal 431b and control signal terminal 431c of the second battery pack 400b can be coupled with the positive power connection terminal 131a, negative power connection terminal 131b and control signal connection terminal 131c of the energy storage device 100, respectively.

Although the five battery packs 400a, . . . , 400e are illustrated in FIG. 2 as being capable of being coupled with the energy storage device 100 at the side 105 thereof, various numbers of battery packs may be coupled with the energy storage device 100.

Figure 6:
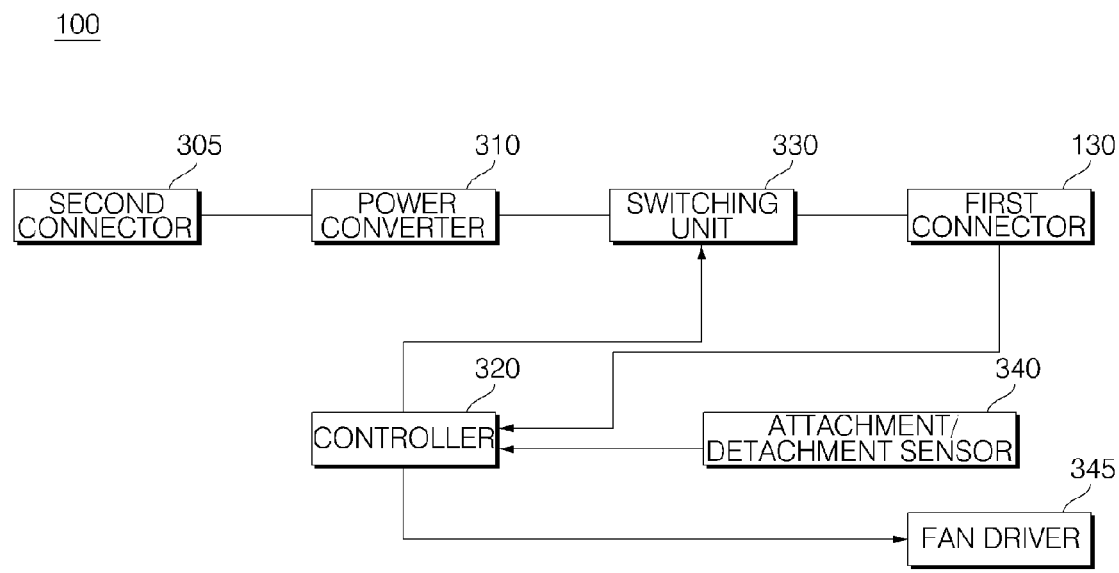
FIG. 6 illustrates a block diagram of the energy storage device in FIG. 1, according to an embodiment of the disclosure.
Figure 7:
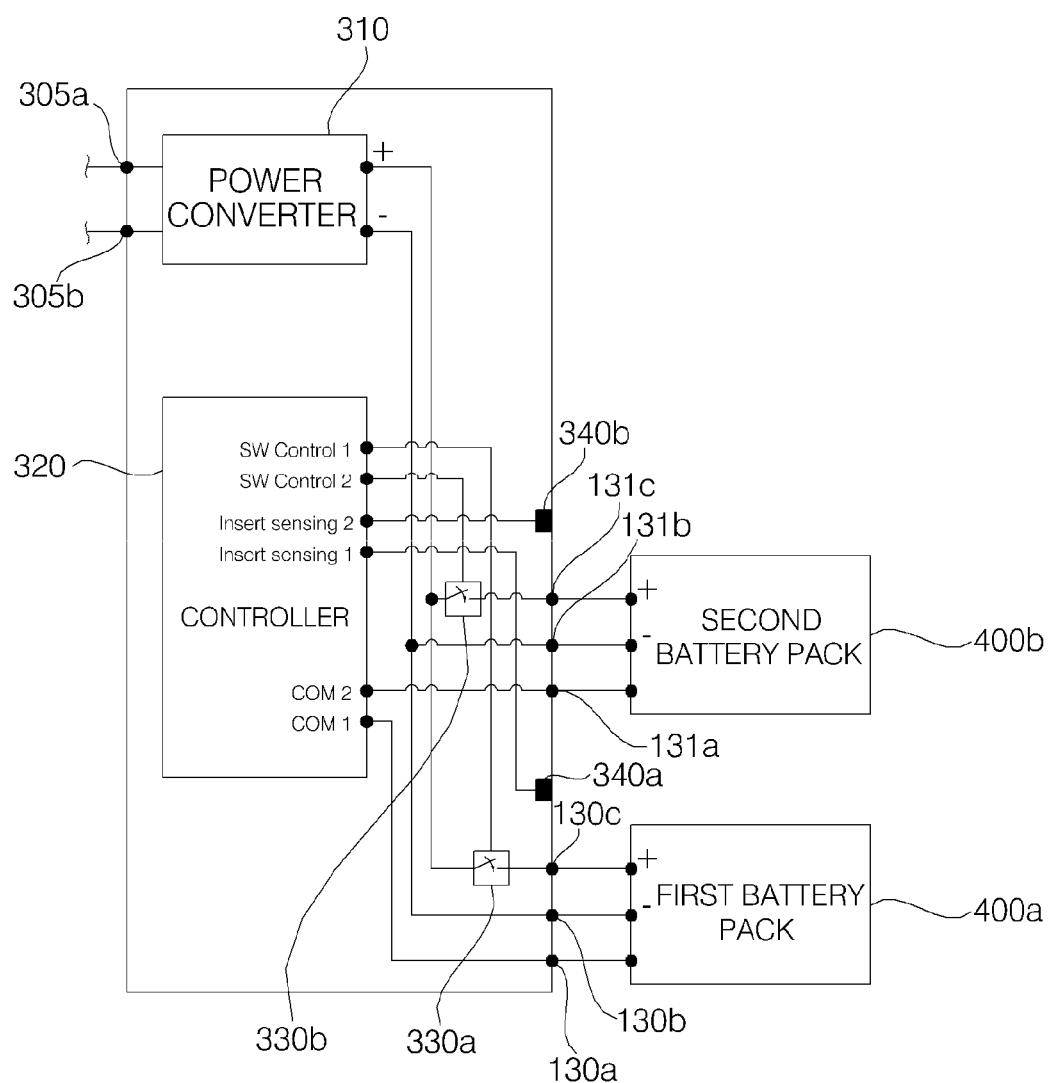
FIG. 7 illustrates a schematic circuit diagram of the energy storage device of FIG. 6, according to an embodiment of the disclosure.

As shown in FIG. 3, energy storage device 100 may have a width W2 larger than the width W1 of the battery pack because it has the internal circuits of FIG. 6 or 7 arranged therein. Although the second battery pack 400b is illustrated in FIG. 3 as being attached just above the first battery pack 400a, it may, alternatively, be coupled with the energy storage device 100 apart from the first battery pack 400a under the condition that the first battery pack 400a is coupled with the energy storage device 100 at the lowermost end of the energy storage device 100.

As a result, because an empty space is defined between the second battery pack 400b and the first battery pack 400a, a support member (not shown) may be coupled with the energy storage device 100 thereof to support the empty space. This support member can preferably be of the same size and shape as those of the battery pack. That is, the support member may have knob-shaped portions, and protrusions corresponding to the respective connection terminals. This support member may be coupled with the energy storage device 100 thereof instead of a battery pack, not coupled.

Figure 4:
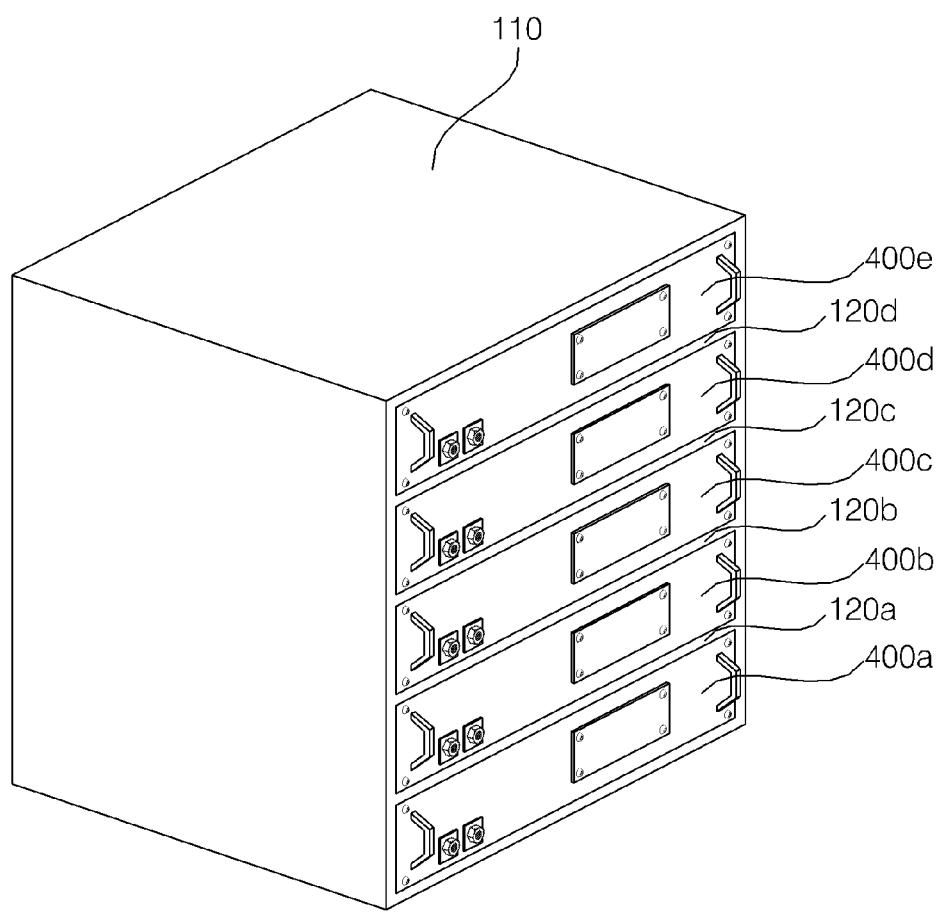
FIG. 4 illustrates a perspective view showing another embodiment of the energy storage device in FIG. 1, according to an embodiment of the disclosure.
Figure 5:
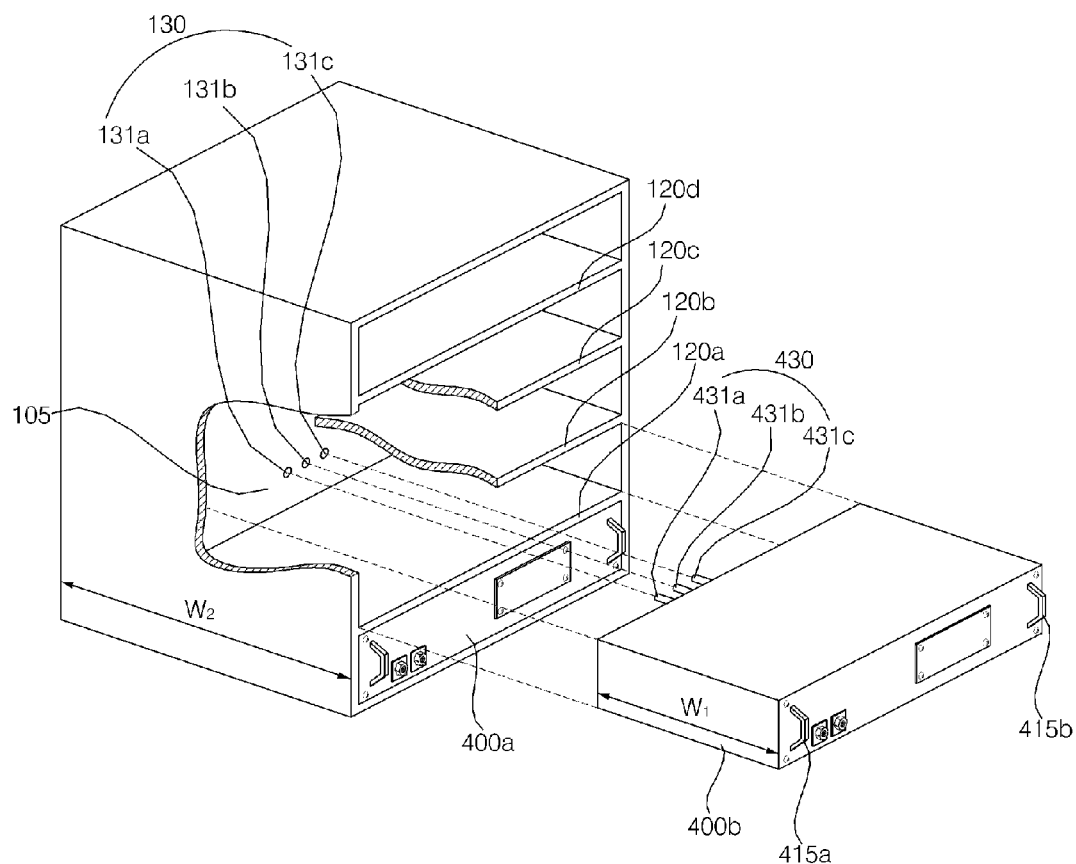
FIG. 5 illustrates a perspective view showing the attachment of a battery pack to the energy storage device of FIG. 4, according to an embodiment of the disclosure.

FIG. 4 shows a perspective view showing another embodiment of the energy storage device in FIG. 1, and FIG. 5 is a perspective view showing attachment of a battery pack to the energy storage device of FIG. 4. Referring to FIGS. 4 and 5, the outer appearance of the energy storage device of FIG. 4 is substantially the same as that of the energy storage device of FIG. 2, with the exception that partitions 120a, 120b, 120c and 120d are arranged in the case 110 of the energy storage device of FIG. 4 to compartmentalize battery packs.

The partitions 120a, 120b, 120c and 120d may function to guide the respective battery packs 400a, . . . , 400e such that the battery packs 400a, . . . , 400e are attached to the energy storage device 100 at the side thereof. These partitions 120a, 120b, 120c and 120d may protect the respective battery packs 400a, . . . , 400e attached to the energy storage device 100.

FIG. 6 illustrates a block diagram of the energy storage device in FIG. 1, and FIG. 7 is a schematic circuit diagram of the energy storage device of FIG. 6. Referring to FIGS. 6 and 7, the energy storage device 100 may include a power converter 310, a controller 320, a switching unit 330, an attachment/detachment sensor 340, a first connector 130, a second connector 305, and a detachable battery pack 400.

Second connector 305 may have an AC power terminal 305a and a DC power terminal 305b. The AC power terminal 305a may receive AC power from the grid 50 in the energy supply system 10 of FIG. 1 or output AC power converted by the energy storage device 100 to the grid 50. The DC power terminal 305b may receive DC power output from the DC/DC converter 30 or DC power at the DC stage a-b or output DC power converted by the energy storage device 100 to the DC stage a-b.

Power converter 310 may convert AC power input through the second connector 305 into DC power or convert the level of input DC power. Then, the converted DC power may be transferred to the battery pack 400 via the switching unit 330 and the first connector 130. Power converter 310 may include a DC/DC converter to convert the level of the input DC power, and a bidirectional DC/AC converter to convert the input AC power into DC power. On the other hand, the power converter 310 may convert the level of DC power stored in the battery pack 400 or convert the stored DC power into AC power. Then, the level-converted DC power or the converted AC power may be transferred to the above-stated DC stage a-b or grid 50 via the second connector 305.

Switching unit 330 is disposed between the power converter 310 and the first connector 130 to perform a switching operation. As a result, the switching unit 330 may supply DC power from the power converter 310 to the first connector 130 or supply DC power from the first connector 130 to the power converter 310.

Detachable battery pack 400 may include the plurality of battery packs 400a to 400e as stated previously, and the switching unit 330 may include switches of a number corresponding to the number of the battery packs 400a to 400e.

Although the switching unit 330 is illustrated in FIG. 7 as including a first switch 330a corresponding to the first battery pack 400a, and a second switch 330b corresponding to the second battery pack 400b, it may further include third to fifth switches 330c, 330d and 330e corresponding respectively to the third to fifth battery packs 400c, 400d and 400e.

Attachment/detachment sensor 340 senses attachment or detachment of the battery pack 400. The attachment/detachment sensor 340 may include attachment/detachment sensing means 340a, 340b, . . . of a number corresponding to the number of the detachable battery packs 400a, 400b, . . . . Each of the attachment/detachment sensing means 340a, 340b, . . . may detect a voltage between a corresponding one of positive power connection terminals 130a, 131a, . . . and a corresponding one of negative power connection terminals 130b, 131b, . . . . On the other hand, a resistor may be used for the voltage detection.

In detail, when each of the battery packs 400a, b, . . . are attached, a potential difference between a corresponding one of the positive power connection terminals 130a, 131a, . . . and a corresponding one of the negative power connection terminals 130b, 131b, . . . corresponds to DC power stored in a corresponding one of the battery packs 400a, 400b, . . . . Each of the attachment/detachment sensing means 340a, 340b, . . . senses whether a corresponding one of the battery packs 400a, 400b, . . . has been attached or detached, by detecting the above potential difference.

For example, when the first battery pack 400a is attached, the potential difference between the first positive power connection terminal 130a and the first negative power connection terminal 130b may correspond to DC power stored in the first battery pack 400a. The first attachment/detachment sensing means 340a detects the potential difference, and may sense that the first battery pack 400a has been attached, when the detected potential difference is higher than or equal to a predetermined level.

In an embodiment, when the first battery pack 400a is detached, the potential difference between the first positive power connection terminal 130a and the first negative power connection terminal 130b may correspond to 0V. The first attachment/detachment sensing means 340a detects the potential difference, and may sense that the first battery pack 400a has been detached, when the detected potential difference is lower than the predetermined level.

Alternatively, each of the attachment/detachment sensing means 340a, 340b, . . . may detect current flowing between a corresponding one of the positive power connection terminals 130a, 131a, . . . and a corresponding one of the negative power connection terminals 130a, 131b, . . . . On the other hand, a current sensor, a current transformer (CT) or a shunt resistor may be used for the current detection.

For example, when the first battery pack 400a is attached, a closed loop may be formed between the first positive power connection terminal 130a and the first negative power connection terminal 130b, and current may flow through the closed loop. The first attachment/detachment sensing means 340a detects the current, and may sense that the first battery pack 400a has been attached, when the level of the detected current is higher than or equal to a predetermined level.

In an embodiment, when the first battery pack 400a is detached, an open loop may be formed between the first positive power connection terminal 130a and the first negative power connection terminal 130b, and thus no current may flow. That is, this current may correspond to 0 A. The first attachment/detachment sensing means 340a detects the current, and may sense that the first battery pack 400a has been detached, when the level of the detected current is lower than the predetermined level.

The voltage or current detected by each of the attachment/detachment sensing means 340a, 340b, . . . may be transferred to the controller 320. Although not shown, the energy storage device 100 may further include an AC power detector for detecting AC power supplied from the second connector 305, and a DC power detector for detecting DC power supplied from the second connector 305.

For example, the AC power detector (not shown) may detect a voltage or current across the AC power terminal 305a of the second connector 305. Also, the DC power detector (not shown) may detect a voltage or current across the DC power terminal 305b of the second connector 305. On the other hand, the detected voltage or current may be transferred to the controller 320. The controller 320 can control the entire operation of the energy storage device 100.

In detail, the controller 320 may control the energy storage device 100 to store external input DC power or AC power in the battery pack 400 or output DC power stored in the battery pack 400 externally. That is, the controller 320 may selectively control the energy storage device 100 such that the battery pack 400 operates in a charge mode or discharge mode.

The controller 320 may receive the level of AC power or DC power detected at an output terminal of the second connector 305 or power converter 310. Controller 320 may also receive a signal indicating whether the battery pack 400 has been attached or detached from the attachment/detachment sensor 340. In addition, when the battery pack 400 is attached, the controller 320 may receive the level of DC power stored in the battery pack 400.

Also, when the level of DC power stored in the battery pack 400 is higher than the level of power detected at the output terminal of the second connector 305 or power converter 310, the controller 320 may selectively control the energy storage device 100 such that the DC power in the battery pack 400 is externally outputted, namely, the energy storage device 100 operates in the discharge mode. At this time, the controller 320 may turn on a corresponding switch of the switching unit 330.

When the level of the DC power stored in the battery pack 400 is lower than the level of the power detected at the output terminal of the second connector 305 or power converter 310, the controller 320 may control the energy storage device 100 such that external power is supplied to the battery pack 400, namely, the energy storage device 100 operates in the charge mode. At this time, the controller 320 may turn on the corresponding switch of the switching unit 330.

In an embodiment where a plurality of battery packs are attached to the energy storage device 100, the controller 320 may receive the levels of DC power stored in the respective battery packs and control the energy storage device 100 based on the received power levels such that power balancing is selectively performed between the battery packs.

For example, when the first battery pack 400a and the second battery pack 400b are attached to the energy storage device 100, the controller 320 may receive respective detected DC power levels of the first battery pack 400a and second battery pack 400b. Then, the controller 320 may compare the detected DC power levels with each other and control the energy storage device 100 based on a result of the comparison to operate any one of the first battery pack 400a and second battery pack 400b in the charge mode and the other one in the discharge mode such that power balancing is performed between the first battery pack 400a and the second battery pack 400b.

For example, when the DC power level of the first battery pack 400a is higher than the DC power level of the second battery pack 400b, the controller 320 may control the energy storage device 100 to operate the first battery pack 400a in the discharge mode and the second battery pack 400b in the charge mode such that the same DC powers are stored in the respective battery packs 400a and 400b. In detail, the controller 320 may change connections of the first and second switches in the switching unit 330.

On the other hand, the controller 320 may receive a signal indicating whether the battery pack 400 has been attached or detached from the attachment/detachment sensor 340. When the battery pack 400 is attached, the controller 320 may immediately control the operation of the switching unit 330 to turn off the corresponding switch of the switching unit 330. For example, when the battery pack 400 is attached to the energy storage device 100, inrush current may be suddenly generated in the energy storage device 100, thereby damaging circuit elements in the energy storage device 100. In order to prevent the spike of inrush current, when the battery pack 400 is attached to the energy storage device 100, the controller 320 may control the operation of the switching unit 330 such that the corresponding switch of the switching unit 330 is kept off for a first off period.

The length of time of the first off period may be adjusted to be longer when the number of battery packs attached increases. That is, when the number of battery packs attached is relatively greater, the peak level of inrush current may be higher. To prevent this relatively large inrush current, it may be preferable that the off period of the corresponding switch of the switching unit 330 can be set to a longer time frame. Next, after the first off period, the battery pack 400 may operate in the charge mode or discharge mode under the control of the controller 320. That is, the corresponding switch of the switching unit 330 may be turned on.

For example, when the battery pack 400 is detached from the energy storage device 100, inrush current may be suddenly generated in the energy storage device 100, thereby damaging circuit elements in the energy storage device 100. To eliminate or limit inrush current, when the battery pack 400 is detached from the energy storage device 100, the controller 320 may control the operation of the switching unit 330 such that the corresponding switch of the switching unit 330 is kept off for a second off period.

The second off period may be set to be longer when the number of battery packs attached is larger. That is, when the number of battery packs attached is larger, the peak level of inrush current may be higher. To limit or eliminate the large inrush current, it can be preferable that the off period of the corresponding switch of the switching unit 330 be controlled to be longer. Next, after the second off period, the battery pack 400 may operate in the charge mode or discharge mode under the control of the controller 320. That is, the corresponding switch of the switching unit 330 may be turned on.

Comparing the first off period for attachment and the second off period for detachment with each other, the first off period for attachment may preferably be longer than the second off period for detachment. The controller 320 may control a switching operation of a switch of the DC/DC converter in the power converter 310 or a switching operation of a switch of the bidirectional DC/AC converter in the power converter 310.

In addition, when the second battery pack 400*b* is attached under the condition that the first battery pack 400*a* operates in the charge mode, the controller 320 may turn off both the switches 330*a* and 330*b* of the switching unit 330 for the first off period and then control the energy storage device 100 such that the second battery pack 400*b*, not the first battery pack 400*a*, operates in the charge mode. After the first off period, the first switch 330*a* may be kept off and the second switch 330*b* may be turned on. Accordingly, the battery packs may be selectively controlled to be evenly charged.

Figure 8:
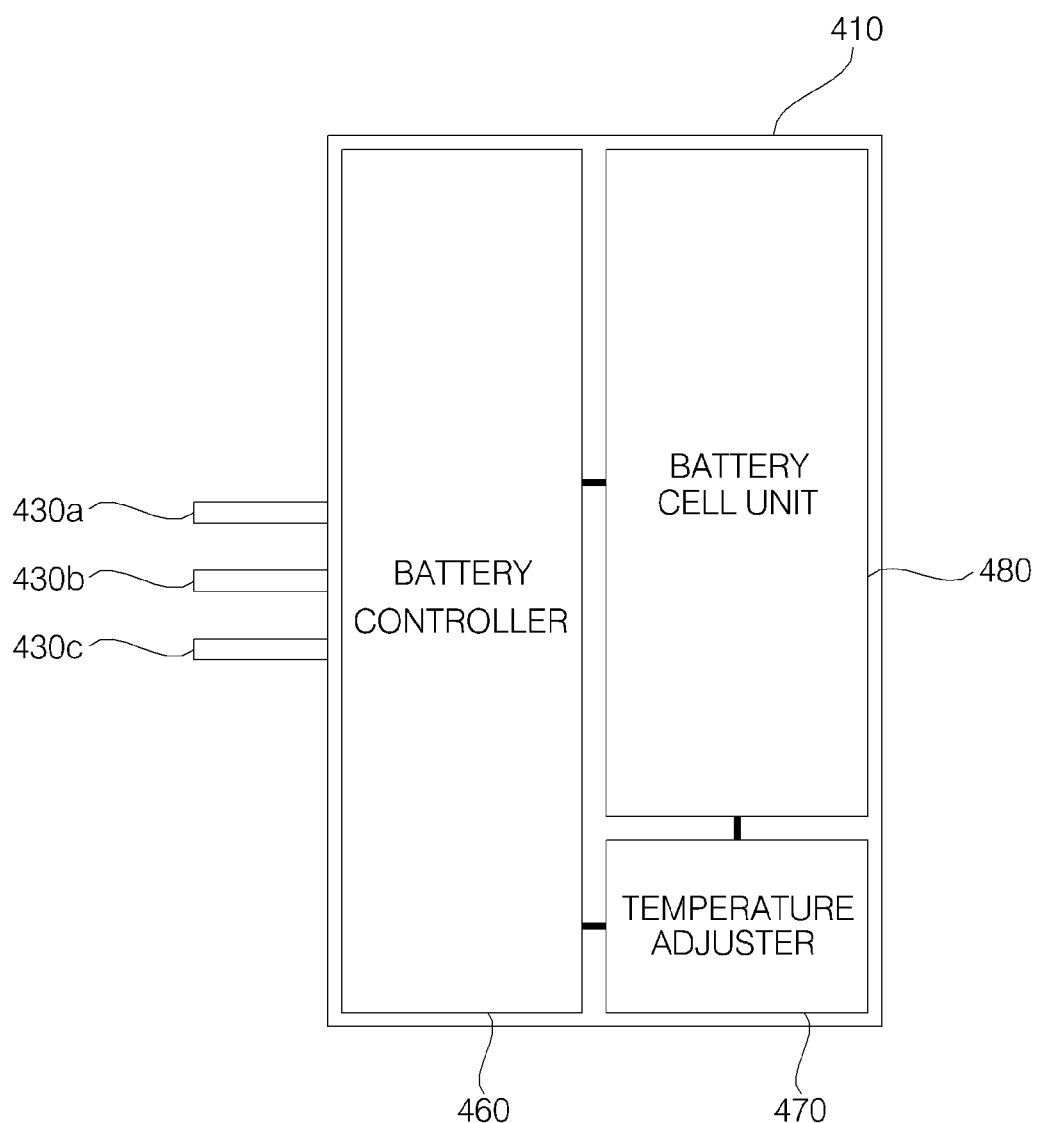
FIG. 8 illustrates an internal block diagram of a battery pack in FIG. 6, according to an embodiment of the disclosure.

FIG. 8 illustrates an internal block diagram of the battery pack in FIG. 6. Referring to FIG. 8, the battery pack 400 includes a battery pack case 410, and a connector 430, a battery controller 460, a battery cell unit 480 and a temperature adjuster 470 provided in the battery pack case 410.

The connector 430 may have protruded connection terminals to be attached to the connector 130 of the energy storage device 100. In detail, the connector 430 may have connection terminals such as the positive power terminal 431*a*, negative power terminal 431*b* and control signal terminal 431*c*. These terminals 431*a*, 431*b* and 431*c* are coupled with the hinged connection terminals of the energy storage device 100, respectively, when the battery pack 400 is attached. The battery cell unit 480 includes a plurality of battery cells. These battery cells may be connected in series, in parallel or in series-parallel combination. Although not shown, the battery cell unit 480 may be electrically connected to the positive power terminal 431*a* and the negative power terminal 431*b*.

Temperature adjuster 470 adjusts the temperature of the battery cell unit 480. To this end, the temperature adjuster 470 may include temperature sensing means (not shown) to sense the temperature of the battery cell unit 480. On the other hand, the temperature adjuster 470 may further include fan driving means (not shown) to drive a fan based on the sensed temperature so as to lower the temperature of the battery cell unit 480. In order to improve efficiency of the temperature adjustment, the fan driving means may preferably be disposed in an area corresponding to an area in which all the battery cells are arranged.

Battery controller 460 performs the overall control of the battery pack 400. For example, when the temperature of the battery cell unit 480 rises over a predetermined temperature, the battery controller 460 may control the temperature adjuster 470 to lower the temperature of the battery cell unit 480.

For example, the battery controller 460 may balance DC powers stored respectively in the battery cells in the battery cell unit 480. That is, the battery controller 460 may detect the DC powers stored respectively in the battery cells and balance the DC powers based on a result of the detection. When the battery pack 400 is attached to the connector 130 of the energy storage device 100, the battery controller 460 may transfer status information (a temperature, the level of power stored, etc.) of the battery pack 400 to the energy storage device 100 through the control signal terminal 431*c*. This status information may be input to the controller 320 of the energy storage device 100. In addition, the battery controller 460 may receive status information (the level of power needed, etc.) of the energy storage device 100 through the control signal terminal 431*c*.

Figure 9:
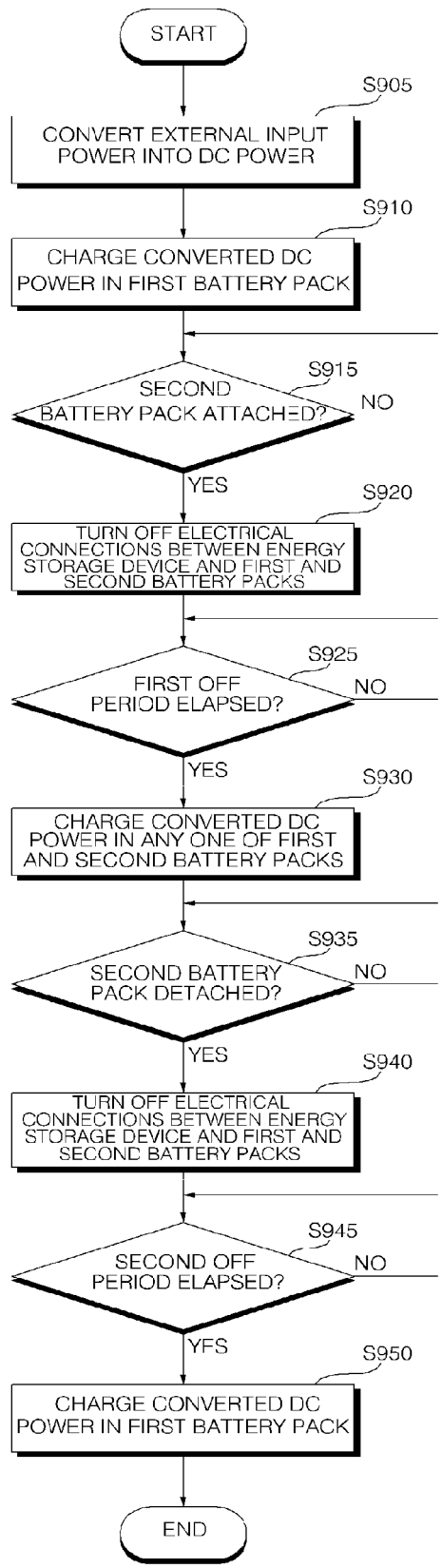
FIG. 9 illustrates a flowchart illustrating a method for controlling an energy storage device, according to an embodiment of the disclosure.
Figure 10A:
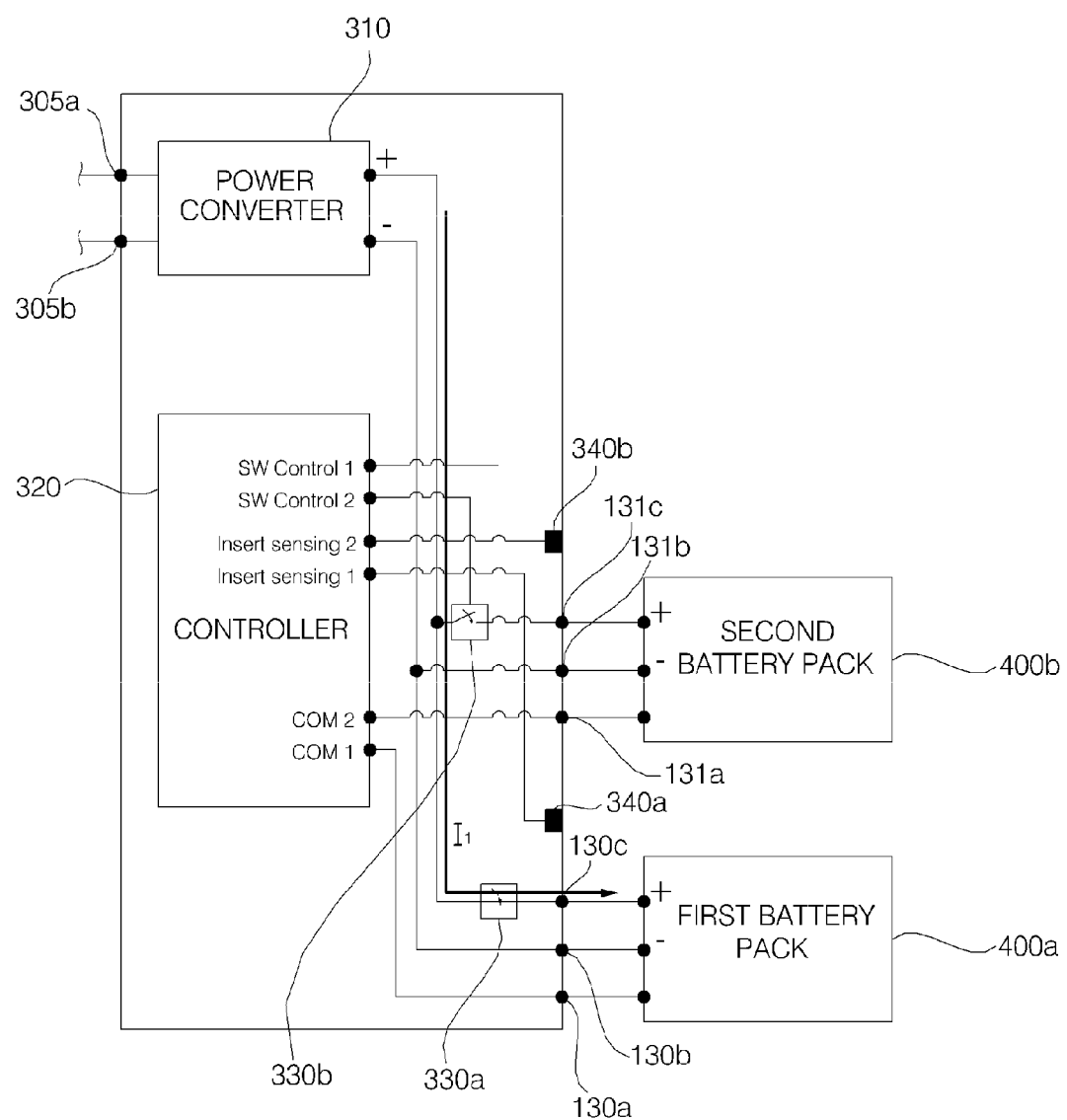

FIG. 9 depicts a flowchart illustrating a method for controlling an energy storage device, and FIGS. 10A to 11 are views referred to for description of the control method of FIG. 9. The energy storage device control method of FIG. 9 will be described based on the operation of the energy storage device in the charge mode. Referring to FIG. 9, first, the energy storage device 100 converts external input power into DC power (S905). Then, the energy storage device 100 charges the converted DC power in the first battery pack 400*a* (S910).

Controller 320 may receive the level of power detected at the output terminal of the second connector 305 or power converter 310, and the level of DC power stored in the attached first battery pack 400*a*. When the level of the DC power stored in the first battery pack 400*a* is lower than the level of the power detected at the output terminal of the second connector 305 or power converter 310, the controller 320 may control the energy storage device 100 such that the external input power is converted and supplied to the first battery pack 400*a*, namely, the energy storage device 100 operates in the charge mode. At this time, the controller 320 may turn on the corresponding switch 330*a* of the switching unit 330.

FIG. 10A illustrates that the power converter 310 and the first battery pack 400*a* are electrically connected with each other owing to the turning-on of the first switch 330*a*. As the power converter 310 and the first battery pack 400*a* are electrically connected with each other, externally supplied AC power or DC power is converted by the power converter 310 and then charged in the first battery pack 400*a* via the first switch 330*a*. That is, first current I1 flows from the power converter 310 to the first battery pack 400*a*.

Next, the controller 320 of the energy storage device 100 determines whether the second battery pack 400*b* has been attached (S915). If it is determined that the second battery pack 400*b* has been attached, the controller 320 performs a control operation to turn off electrical connections between the energy storage device 100 and the first and second battery packs 400*a* and 400*b* (S920). The controller 320 may receive an attachment/detachment sense signal from the attachment/detachment sensor 340. For example, the second attachment/detachment sensing means 340*b* corresponding to the second battery pack 400*b* may sense whether the second battery pack 400*b* has been attached. When the level of a DC voltage detected by the second attachment/detachment sensing means 340*b* is higher than or equal to a predetermined level, the controller 320 may recognize that the second battery pack 400*b* has been attached.

In an embodiment, when it is determined that the second battery pack 400*b* has been attached, the controller 320 performs the control operation to turn off the electrical connections between the energy storage device 100 and the first and second battery packs 400a and 400b, so as to prevent inrush current from being generated in the energy storage device 100. Accordingly, the controller 320 may turn off all switches of the switching unit 330 including the corresponding switches 330a and 330b.

Figure 10B:
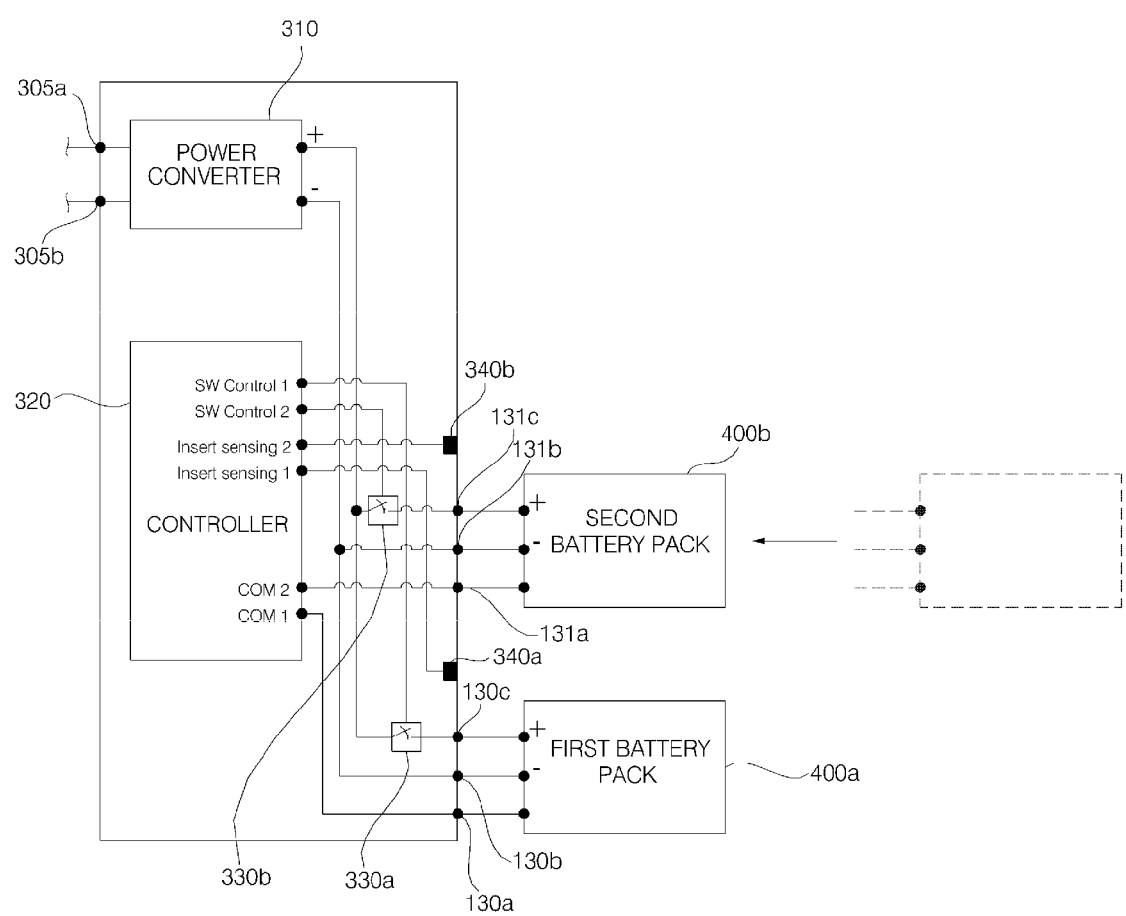

FIG. 10B illustrates that the power converter 310 and the first battery pack 400a and second battery pack 400b are electrically isolated from each other owing to the turning-off of the first switch 330a and second switch 330b. Ultimately, externally supplied AC power or DC power is not supplied to all battery packs attached to the energy storage device 100. As a result, no inrush current is generated in the energy storage device 100, thereby protecting circuit elements in the energy storage device 100.

Next, the controller 320 determines whether the first off period has elapsed (S925), and charges the converted DC power in any one of the first and second battery packs 400a and 400b upon determining that the first off period has elapsed (S930). If the first off period has elapsed, the controller 320 may control the energy storage device 100 again in the charge mode such that the DC power converted by the power converter 310 is charged in a battery pack.

Controller 320 may receive the DC power level of the attached first battery pack 400a and the DC power level of the attached second battery pack 400b, and control the energy storage device 100 based on the received DC power levels such that any one of the first and second battery packs 400a and 400b having a lower one of the DC power levels is charged. Alternatively, because the DC power was charged in the first battery pack 400a in step S910, the controller 320 may control the energy storage device 100 such that the DC power is charged in the second battery pack 400b for charge balancing.

Figure 10C:
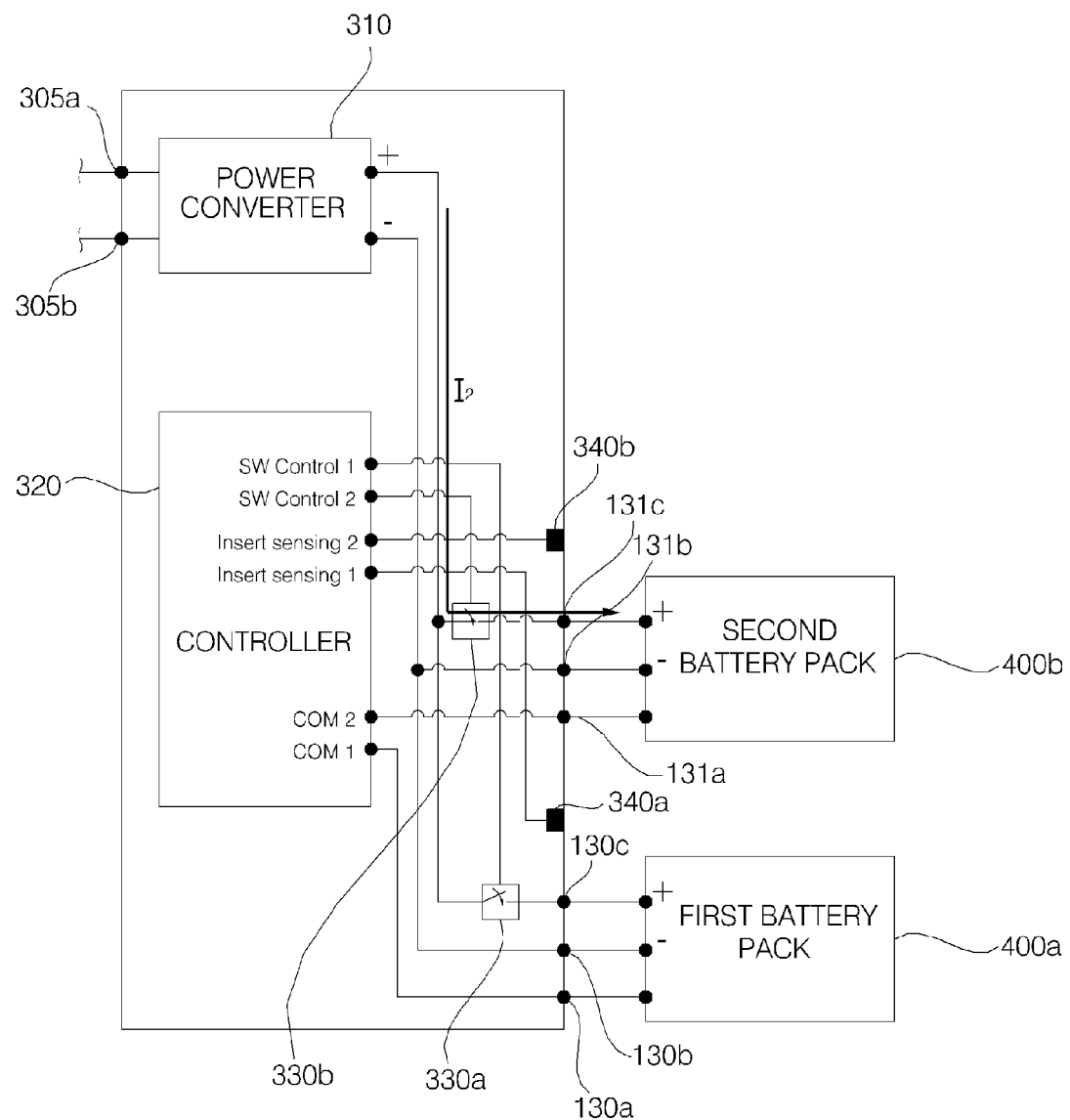

FIG. 10C illustrates that the power converter 310 and the second battery pack 400b are electrically connected with each other owing to the turning-on of the second switch 330b. As the power converter 310 and the second battery pack 400b are electrically connected with each other, externally supplied AC power or DC power is converted by the power converter 310 and then charged in the second battery pack 400b via the second switch 330b. That is, second current I2 flows from the power converter 310 to the second battery pack 400b.

The first off period in which all switches of the switching unit 330 are turned off may vary with the number of battery packs attached to the energy storage device 100. For example, the controller 320 may set the first off period to be longer when the number of battery packs attached to the energy storage device 100 is larger. This is for protecting circuit elements in the energy storage device 100 in consideration of the fact that the amount of current flowing to battery packs is larger in the charge mode when the number of battery packs is larger.

FIG. 11A illustrates a waveform S1 applied to each switch when one battery pack is additionally attached under the condition that one battery pack is attached to the energy storage device 100. In a first period T1, both switches are turned off.

FIG. 11B illustrates a waveform S2 applied to each switch when one battery pack is additionally attached under the condition that two battery packs are attached to the energy storage device 100. In a second period T2 which is longer than the first period T1 of FIG. 11(a), all switches are turned off.

Next, the controller 320 determines whether the second battery pack 400b has been detached (S935). If it is determined that the second battery pack 400b has been detached, the controller 320 performs the control operation to turn off the electrical connections between the energy storage device 100 and the first and second battery packs 400a and 400b (S940).

The controller 320 may receive the attachment/detachment sense signal from the attachment/detachment sensor 340. For example, the second attachment/detachment sensing means 340b corresponding to the second battery pack 400b may sense whether the second battery pack 400b has been detached. When the level of the DC voltage detected by the second attachment/detachment sensing means 340b is lower than the predetermined level, namely, when it is, for example, 0V, the controller 320 may recognize that the second battery pack 400b has been detached.

In an embodiment, when it is determined that the second battery pack 400b has been detached, the controller 320 performs the control operation to turn off the electrical connections between the energy storage device 100 and the first and second battery packs 400a and 400b, so as to prevent inrush current from being generated in the energy storage device 100. In this case, the controller 320 may turn off all switches of the switching unit 330 including the corresponding switches 330a and 330b.

Figure 10D:
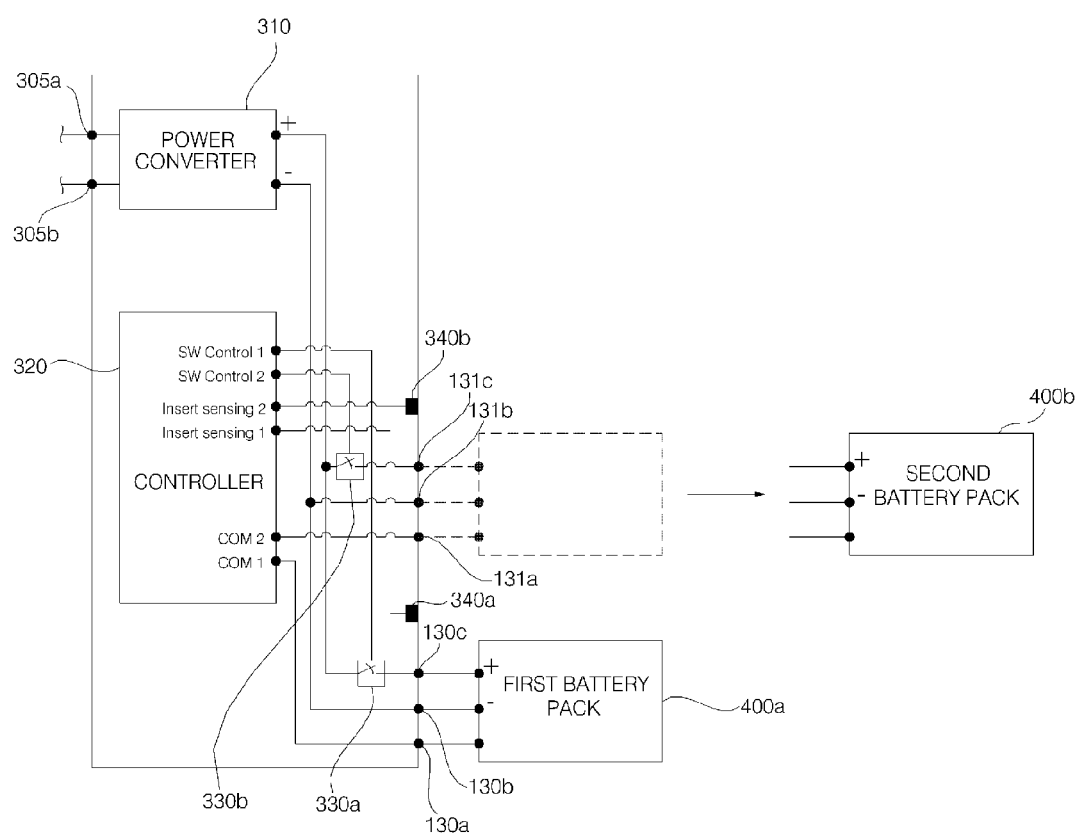

FIG. 10D illustrates that the power converter 310 and the first battery pack 400a and second battery pack 400b are electrically isolated from each other owing to the turning-off of the first switch 330a and second switch 330b. Ultimately, externally supplied AC power or DC power is not supplied to all battery packs attached to the energy storage device 100. As a result, no inrush current is generated in the energy storage device 100, thereby protecting circuit elements in the energy storage device 100.

Next, the controller 320 determines whether the second off period has elapsed (S945), and charges the converted DC power in the first battery pack 400a upon determining that the second off period has elapsed (S950). If the second off period has elapsed, the controller 320 may control the energy storage device 100 again in the charge mode such that the DC power converted by the power converter 310 is charged in a battery pack. That is, as shown in FIG. 10A, the DC power from the power converter 310 may be charged in the first battery pack 400a as the first switch 330a is turned on.

The first off period, which is an off period for battery pack attachment, may preferably be longer than the second off period, which is an off period for battery pack detachment. This is for protecting circuit elements in the energy storage device 100 in consideration of the fact that the level of a DC voltage instantaneously rises by at least one battery pack upon attachment rather than upon detachment.

FIG. 11C illustrates a waveform S3 applied to each switch when one battery pack is detached under the condition that two battery packs are attached to the energy storage device 100. In a third period T3 which is shorter than the first period T1 of FIG. 11(a), both switches are turned off.

Figure 12:
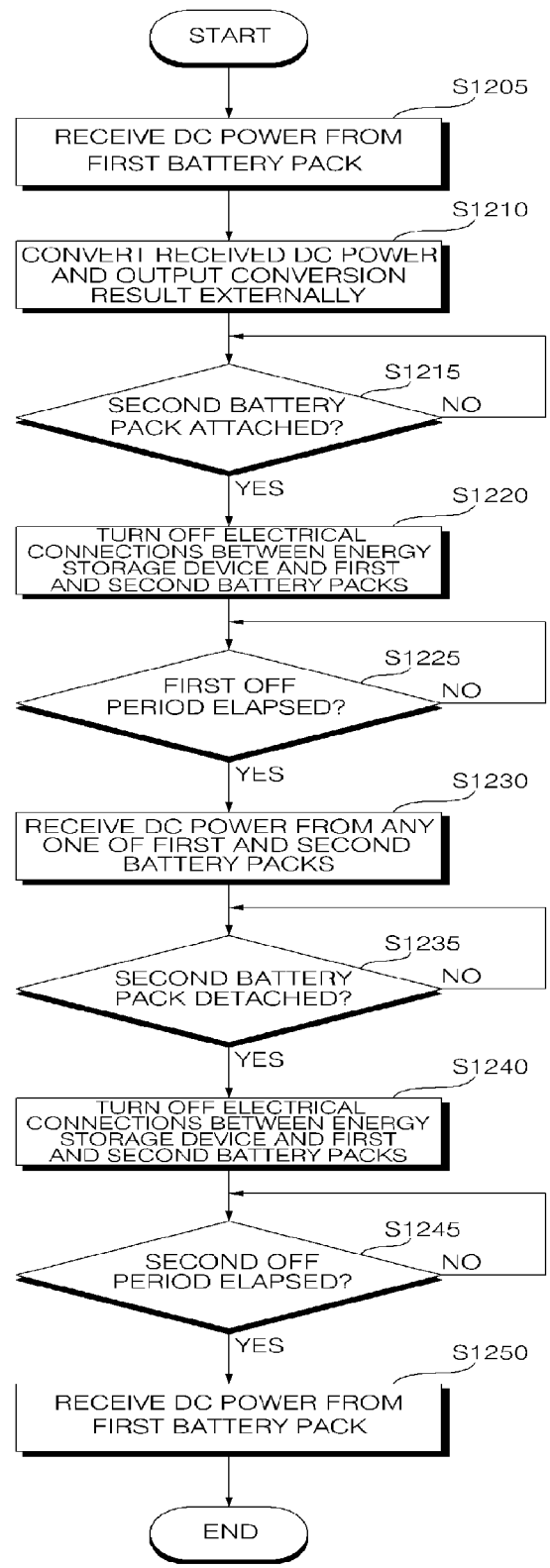
FIG. 12 illustrates a flowchart of a method for controlling an energy storage device, according to an embodiment of the disclosure; and
}
Figure 13A:
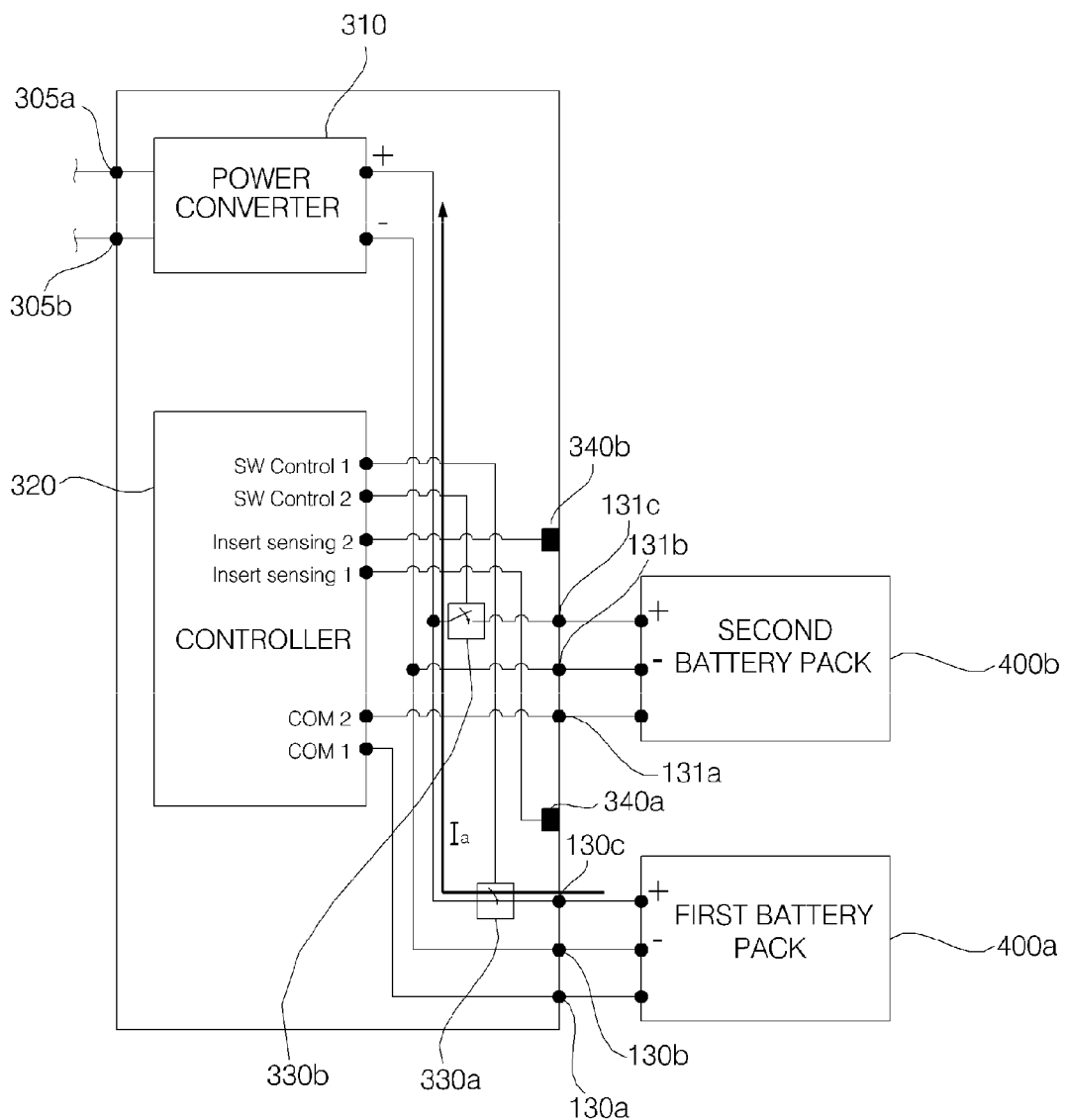
FIGS. 13A-E and 14A-C illustrate views referred to for description of the control method of FIG. 12, according to an embodiment of the disclosure.
Figure 13B:
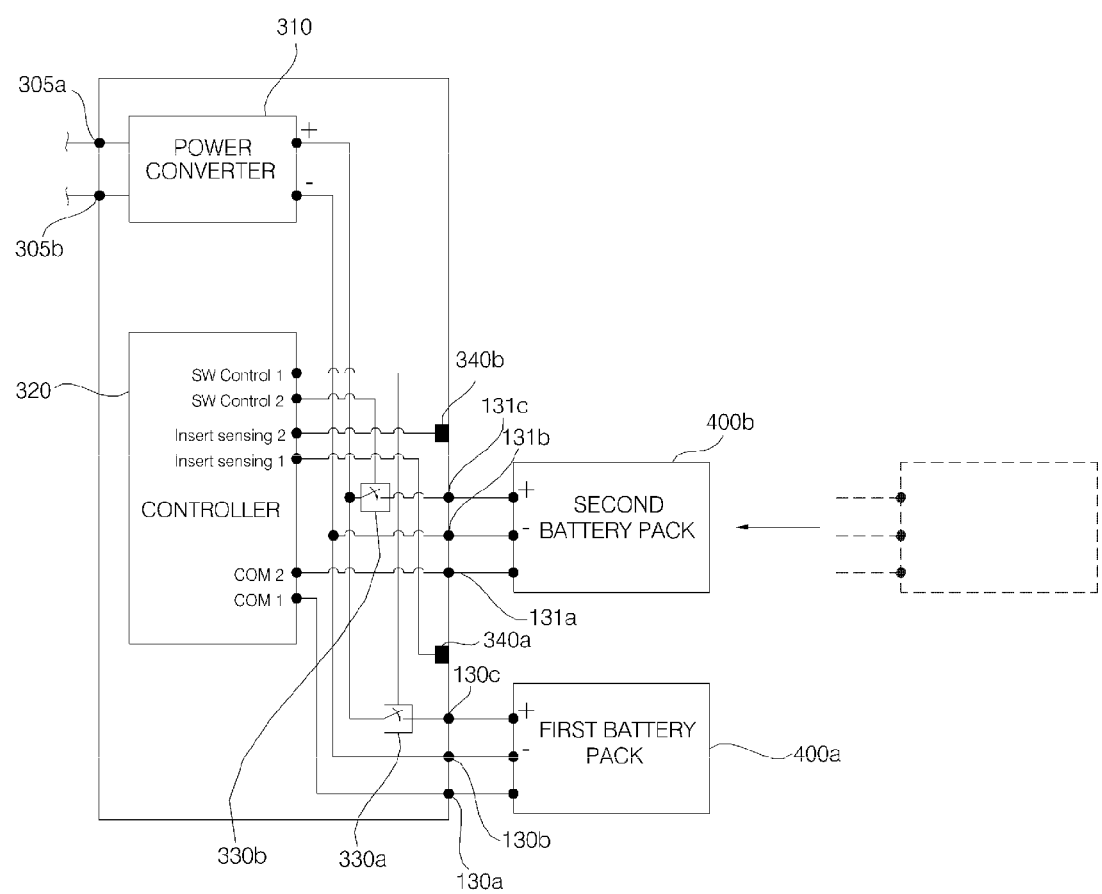
Figure 13C:
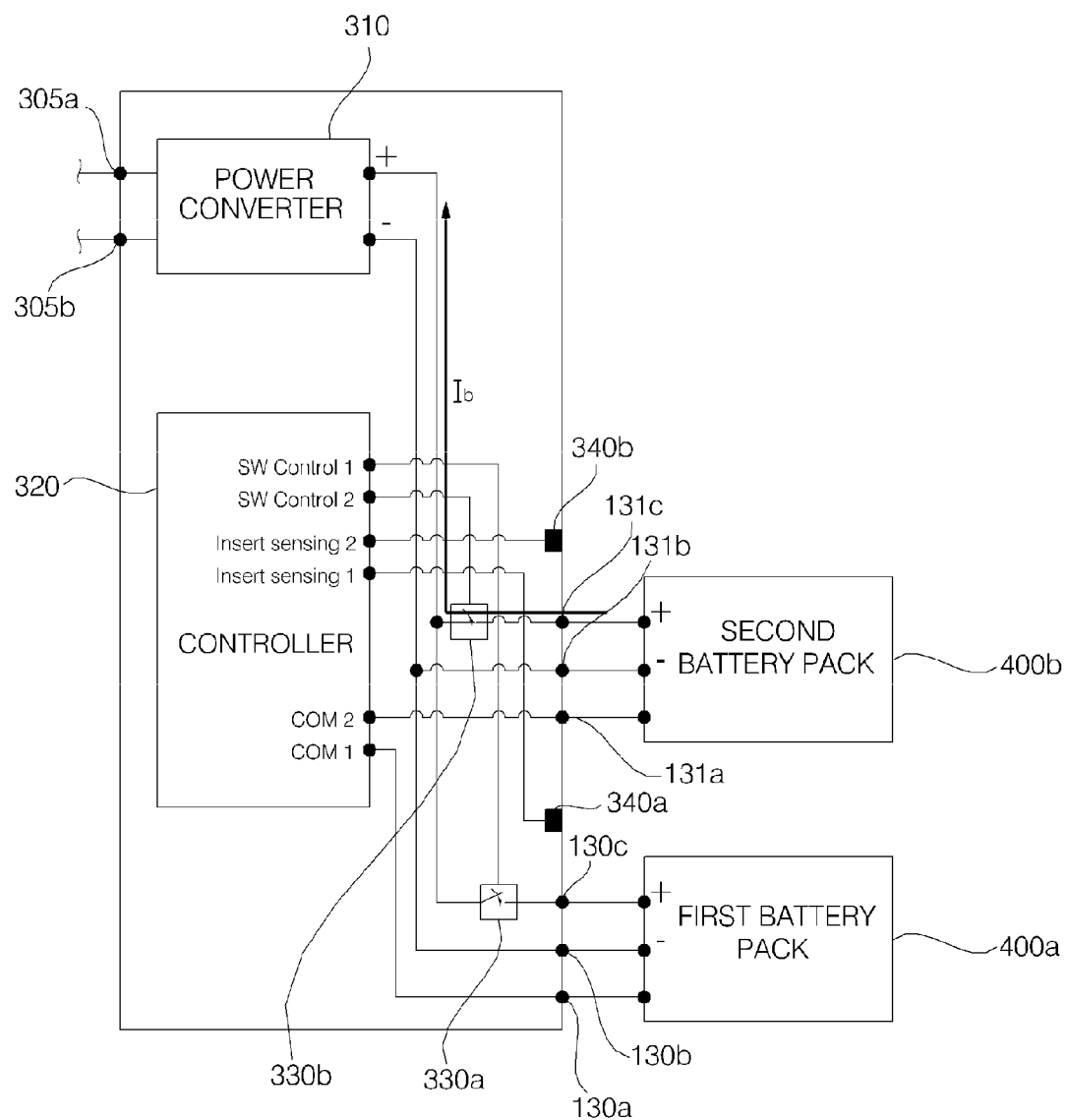
Figure 13D:
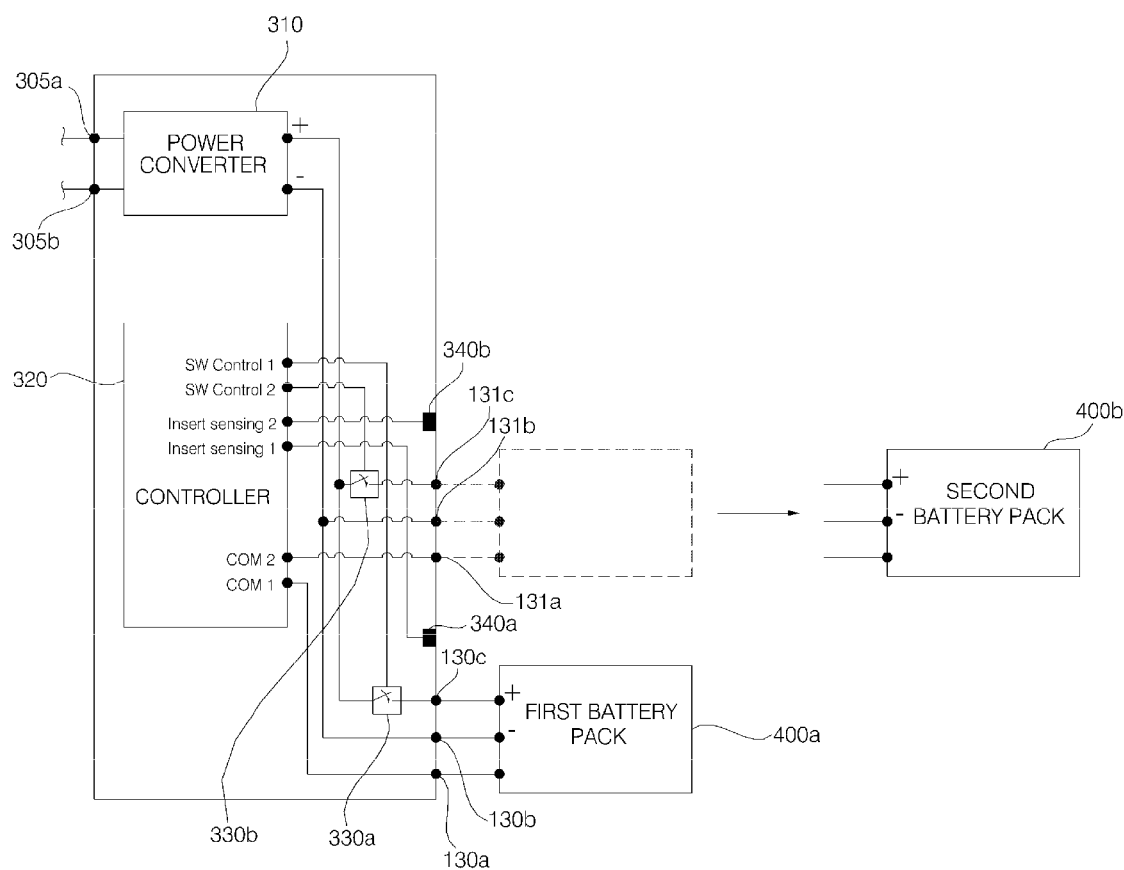
Figure 13E:
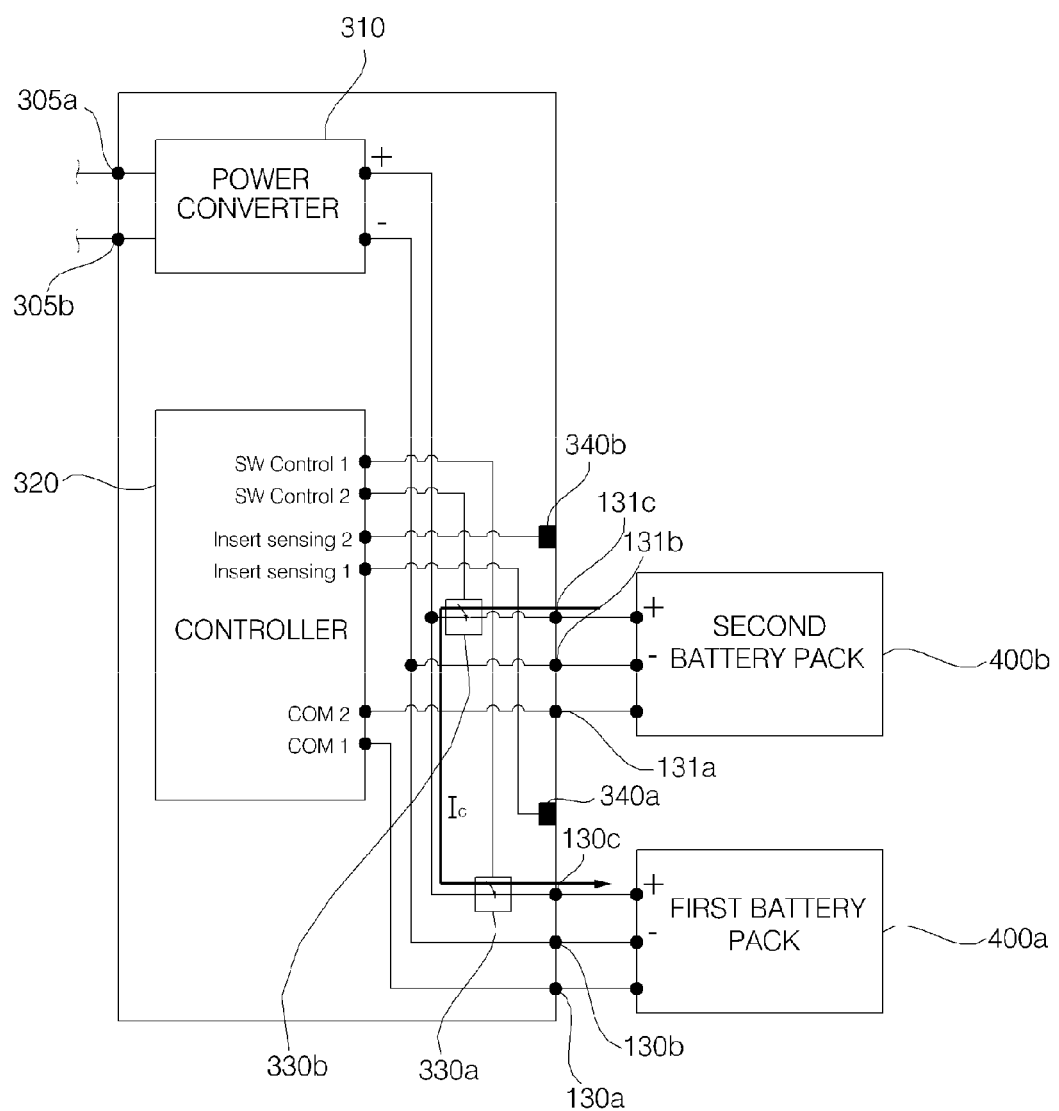
Figure 14:
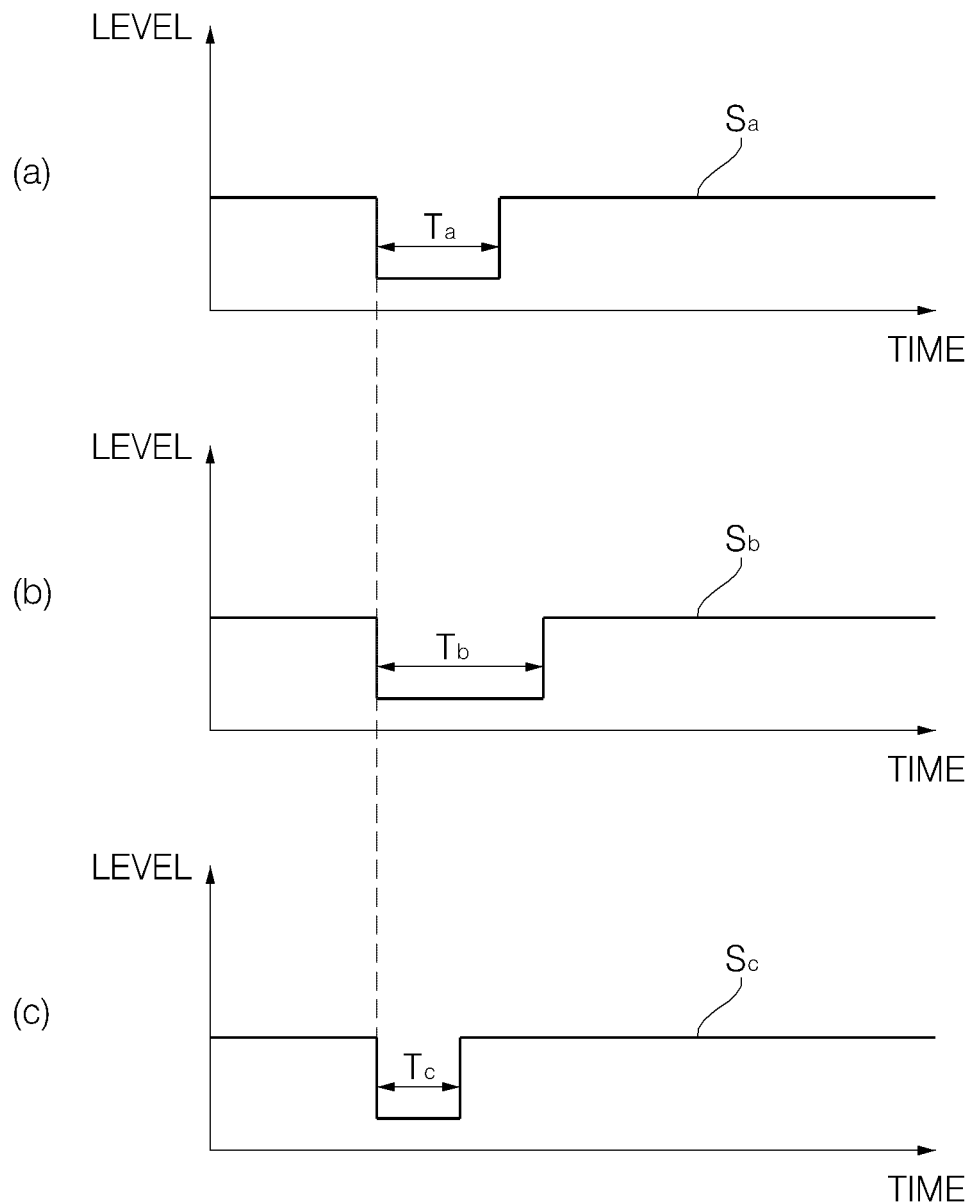

FIG. 12 depicts a flowchart illustrating a method for controlling an energy storage device, and FIGS. 13A to 14 are views referred to for description of the control method of FIG. 12. The energy storage device control method of FIG. 12 will be described based on the operation of the energy storage device in the discharge mode.

Referring to FIG. 12, first, the energy storage device 100 receives DC power from the first battery pack 400a (S1205). Then, the energy storage device 100 converts the received DC power and outputs the conversion result externally (S1210). When the level of DC power stored in the first battery pack 400a is higher than the level of power detected at the output terminal of the second connector 305 or power converter 310, the controller 320 may control the energy storage device 100 such that the DC power in the first battery pack 400a is externally output, namely, the energy storage device 100 operates in the discharge mode. At this time, the controller 320 may turn on the corresponding switch 330a of the switching unit 330.

FIG. 13A illustrates that the power converter 310 and the first battery pack 400a are electrically connected with each other owing to the turning-on of the first switch 330a. As the power converter 310 and the first battery pack 400a are electrically connected with each other, DC power supplied from the first battery pack 400a is converted by the power converter 310 via the first switch 330a and the converted AC power or DC power is externally output. That is, first current Ia flows from the first battery pack 400a to the power converter 310.

Next, the controller 320 of the energy storage device 100 determines whether the second battery pack 400b has been attached (S1215). If it is determined that the second battery pack 400b has been attached, the controller 320 performs a control operation to turn off electrical connections between the energy storage device 100 and the first and second battery packs 400a and 400b (S1220).

The controller 320 may receive an attachment/detachment sense signal from the attachment/detachment sensor 340. For example, the second attachment/detachment sensing means 340b corresponding to the second battery pack 400b may sense whether the second battery pack 400b has been attached. When the level of a DC voltage detected by the second attachment/detachment sensing means 340b is higher than or equal to a predetermined level, the controller 320 may recognize that the second battery pack 400b has been attached.

In an embodiment, when it is determined that the second battery pack 400b has been attached, the controller 320 performs the control operation to turn off the electrical connections between the energy storage device 100 and the first and second battery packs 400a and 400b, so as to prevent inrush current from being generated in the energy storage device 100. In this case, the controller 320 may turn off all switches of the switching unit 330 including the corresponding switches 330a and 330b.

FIG. 13B illustrates that the power converter 310 and the first battery pack 400a and second battery pack 400b are electrically isolated from each other owing to the turning-off of the first switch 330a and second switch 330b. Next, the controller 320 determines whether the first off period has elapsed (S1225), and receives DC power from any one of the first and second battery packs 400a and 400b upon determining that the first off period has elapsed (S1230). If the first off period has elapsed, the controller 320 may control the energy storage device 100 again in the discharge mode such that DC power from any one of the first and second battery packs 400a and 400b is received, converted by the power converter 310, and then outputted externally.

Controller 320 may receive the DC power level of the attached first battery pack 400a and the DC power level of the attached second battery pack 400b, and control the energy storage device 100 based on the received DC power levels such that DC power from any one of the first and second battery packs 400a and 400b having a higher one of the DC power levels is received. Alternatively, because the DC power from the first battery pack 400a was received in step S1205, the controller 320 may control the energy storage device 100 such that DC power from the second battery pack 400b is received for discharge balancing.

FIG. 13C illustrates that the power converter 310 and the second battery pack 400b are electrically connected with each other owing to the turning-on of the second switch 330b. As the power converter 310 and the second battery pack 400b are electrically connected with each other, DC power supplied from the second battery pack 400b is converted by the power converter 310 via the second switch 330b and then externally output. That is, second current Ib flows from the second battery pack 400b to the power converter 310.

The first off period in which all switches of the switching unit 330 are turned off may vary with the number of battery packs attached to the energy storage device 100. For example, the controller 320 may set the first off period to be longer when the number of battery packs attached to the energy storage device 100 is larger.

FIG. 14(a) illustrates a waveform Sa applied to each switch when one battery pack is additionally attached under the condition that one battery pack is attached to the energy storage device 100. In a first period Ta, both switches are turned off.

FIG. 14(b) illustrates a waveform Sb applied to each switch when one battery pack is additionally attached under the condition that two battery packs are attached to the energy storage device 100. In a second period Tb which is longer than the first period Ta of FIG. 14(a), all switches are turned off.

Next, the controller 320 determines whether the second battery pack 400b has been detached (S1235). If it is determined that the second battery pack 400b has been detached, the controller 320 performs the control operation to turn off the electrical connections between the energy storage device 100 and the first and second battery packs 400a and 400b (S1240). The controller 320 may receive the attachment/detachment sense signal from the attachment/detachment sensor 340. For example, the second attachment/detachment sensing means 340b corresponding to the second battery pack 400b may sense whether the second battery pack 400b has been detached.

In an embodiment, when it is determined that the second battery pack 400b has been detached, the controller 320 performs the control operation to turn off the electrical connections between the energy storage device 100 and the first and second battery packs 400a and 400b, so as to prevent inrush current from being generated in the energy storage device 100. In this case, the controller 320 may turn off all switches of the switching unit 330 including the corresponding switches 330a and 330b.

FIG. 13D illustrates that the power converter 310 and the first battery pack 400a and second battery pack 400b are electrically isolated from each other owing to the turning-off of the first switch 330a and second switch 330b. Ultimately, externally supplied AC power or DC power is not supplied to all battery packs attached to the energy storage device 100. As a result, no inrush current is generated in the energy storage device 100, thereby protecting circuit elements in the energy storage device 100.

Power balancing may be performed between battery packs. The controller 320 may receive DC power levels of battery packs attached to the energy storage device 100, and control the energy storage device 100 based on the received DC power levels such that power balancing is performed when the difference between the levels is greater than or equal to a predetermined value.

FIG. 13E illustrates that the power converter 310 and the first battery pack 400a and second battery pack 400b are electrically isolated from each other and, instead, the first battery pack 400a and the second battery pack 400b are electrically connected with each other owing to the turning-on of both the first switch 330a and second switch 330b. As shown in FIG. 13E, when the level of DC power stored in the second battery pack 400b is higher, the DC power stored in the second battery pack 400b is supplied to the first battery pack 400a via the second switch 330b and the first switch 330a. That is, third current Ic flows from the second battery pack 400b to the first battery pack 400a.

Next, the controller 320 determines whether the second off period has elapsed (S1245), and receives the DC power from the first battery pack 400a upon determining that the second off period has elapsed (S1250). If the second off period has elapsed, the controller 320 may control the energy storage device 100 again in the discharge mode such that the DC power from the first battery pack 400a is received, converted by the power converter 310, and then outputted externally.

The first off period, which is an off period for battery pack attachment, may preferably be longer than the second off period, which is an off period for battery pack detachment. This is for protecting circuit elements in the energy storage device 100 in consideration of the fact that the level of a DC voltage instantaneously rises by at least one battery pack upon attachment rather than upon detachment.

FIG. 14(c) illustrates a waveform Sc applied to each switch when one battery pack is detached under the condition that two battery packs are attached to the energy storage device 100. In a third period Tc which is shorter than the first period Ta of FIG. 14(a), both switches are turned off.

The energy storage device is not limited to the configurations and methods of the above-described embodiments, and all or some of these embodiments may be selectively combined and configured so that those embodiments may be subjected to various modifications.

The energy storage device control method may be implemented in a recording medium readable by the processor of the energy storage device by processor-readable codes. The processor-readable recording medium may include all types of recording units in which processor-readable data may be stored. For example, the processor-readable recording medium may include a ROM, a RAM, a CD-ROM, a magnetic tape, a floppy disk, an optical data storage, or the like. The processor-readable recording medium may also be implemented in the form of a carrier wave such as transmission over the Internet. Also, the processor-readable recording medium may be distributed to networked computer systems and processor-readable codes may be stored and executed in the computer systems in a distributed manner.

As is apparent from the above description, when a battery pack is attached or detached to or from an energy storage device, electrical connections between the energy storage device and all battery packs attached to the energy storage device can be first turned off irrespective of the operation mode of the energy storage device, thereby reducing inrush current in the energy storage device or battery packs. Therefore, improved stability of circuit elements in the energy storage device is provided.

In addition, an off period of a switching unit may be adjustable. This may be advantageous when the number of battery packs attached is larger. Therefore, it may be possible to improve stability of circuit elements in the energy storage device even further. For example, a first off period for battery pack attachment to the energy storage device and a second off period for battery pack detachment from the energy storage device may be set to be different from each other, thereby making it possible to efficiently control the operation of the energy storage device. Power balancing may also be performed based on DC power levels of battery packs attached, thereby improving stability of the energy storage device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An energy storage device comprising:
    at least one battery pack;
    a connector to or from which the at least one battery pack is attached or detached;
    a power converter that converts external input power into direct current (DC) power in a charge mode;
    a switching unit to perform a switching operation that charges a first battery pack of the at least one battery pack with the DC power converted by the power converter, the first battery pack attached to the connector in the charge mode; and
    a controller to control the switching unit by turning off electrical connections between the power converter and the first battery pack, or between the power converter and a second battery pack of the at least one battery pack for a predetermined off period when the first and second battery packs are attached to the connector,
    wherein each battery pack includes:
    a connector including a positive power terminal, a negative power terminal and a control signal terminal;
    a battery cell unit; and
    a battery controller configured to control the battery cell unit,
    wherein when the second battery pack is attached under the condition that the first battery pack operates in the charge mode, the controller controls to turn off a first switch and a second switch of the switching unit during a first off period,
    wherein after the first off period, the controller controls to keep off the first switch and turn on the second switch such that the second battery pack, not the first battery pack, operates in the charge mode.

2. The energy storage device according to claim 1, wherein the controller performs a control operation during the charge mode that selects and charges one of the first and second battery packs with the converted DC power after the predetermined off period elapses, the selection based on which of the first and second battery packs has a lower level of DC power.

3. The energy storage device according to claim 1, wherein the controller controls the switching unit to turn off the electrical connections between the energy storage device and the first and second battery packs for the predetermined off period when the second battery pack is detached.

4. The energy storage device according to claim 1, wherein the controller sets a length of the off period to be longer when a number of battery packs attached to the energy storage device increases.

5. The energy storage device according to claim 3, wherein the controller sets a length of the off period to be longer when the second battery pack is attached to the energy storage device in comparison to when the second battery pack is detached from the energy storage device.

6. The energy storage device according to claim 1,
    wherein the connector includes positive power connection terminal, negative power connection terminal and control signal connection terminal, which are coupled with the positive power terminal, the negative power terminal and the control signal terminal of the attached battery pack, respectively,
    wherein the controller performs a control operation that power balances a plurality of battery packs based on a levels of DC power stored in the respective battery packs when the plurality of battery packs are attached to the connector, wherein the levels of DC power is received through control signal connection terminal from each battery pack.

7. The energy storage device according to claim 1, wherein the power converter converts DC power supplied from the first or second battery packs attached to the connector and externally output a result of the conversion during a discharge mode.

8. The energy storage device according to claim 7, wherein the controller performs a control operation during the discharge mode that selects and supplies DC power from one of the first or second battery packs to the power converter after the predetermined off period elapses, the selection based on which of the first and second battery packs has a higher level of DC power.

9. A method for controlling an energy storage device to or from which at least one battery pack is attachable or detachable, the method comprising:
   converting, by a power converter, external input power into direct current (DC) power;
   charging the converted DC power in a first battery pack of the at least one battery pack attached to the energy storage device; and
   turning off electrical connections between the power converter and the first battery pack, or between the power converter and a second battery pack of the at least one battery pack for a predetermined off period when the second battery pack is attached to the energy storage device,
   wherein each battery pack includes:
   a connector including a positive power terminal, a negative power terminal and a control signal terminal;
   a battery cell unit; and
   a battery controller configured to control the battery cell unit,
   wherein when the second battery pack is attached under the condition that the first battery pack operates in the charge mode, a first switch and a second switch of the switching unit are turned off during a first off period,
   wherein after the first off period, the first switch is kept off and the second switch is turned on such that the second battery pack, not the first battery pack, operates in the charge mode.

10. The method according to claim 9, further comprising:
   charging the converted DC power in the second battery pack after the predetermined off period.

11. The method according to claim 9, further comprising:
   charging one of the first or second battery packs based on which of the first and second battery packs has lower of a lower level of converted DC power stored therein after the predetermined off period.

12. The method according to claim 11, further comprising:
   turning off the electrical connections between the energy storage device and the first and second battery packs for the predetermined off period when the second battery pack is detached from the energy storage device.

13. The method according to claim 9, wherein a length of the off period corresponds to a number of battery packs attached to the energy storage device.

14. The method according to claim 12, wherein a length of the off period is set to be longer when the second battery pack is attached to the energy storage device in comparison to when the second battery pack is detached from the energy storage device.

15. A method for controlling an energy storage device to or from which at least one battery pack is attachable or detachable, the method comprising:
   Receiving, by a connector, direct current (DC) power from a first battery pack of the at least one battery pack attached to the energy storage device;
   Converting, by a power converter, the DC power received from the first battery pack and externally outputting a result of the conversion; and
   turning off electrical connections between the power converter and the first battery pack, or between the power converter and a second battery pack of the at least one battery pack for a predetermined off period when the second battery pack is attached to the energy storage device,
   wherein each battery pack includes:
   a connector including a positive power terminal, a negative power terminal and a control signal terminal;
   a battery cell unit; and
   a battery controller configured to control the battery cell unit,
   wherein when the second battery pack is attached under the condition that the first battery pack operates in the charge mode, a first switch and a second switch of the switching unit are turned off during a first off period,
   wherein after the first off period, the first switch is kept off and the second switch is turned on such that the second battery pack, not the first battery pack, operates in the charge mode.

16. The method according to claim 15, further comprising:
   receiving DC power from the second battery pack after the predetermined off period; and
   converting the DC power received from the second battery pack and externally outputting a result of the conversion.

17. The method according to claim 15, further comprising:
   receiving DC power from one of the first or second battery packs based on which of the first and second battery packs has a higher level of DC power stored therein after the predetermined off period.

18. The method according to claim 16, further comprising:
   turning off the electrical connections between the energy storage device and the first and second battery packs for the predetermined off period when the second battery pack is detached from the energy storage device.

19. The method according to claim 15, wherein the off period increases when a number of battery packs attached to the energy storage device increases.

20. The method according to claim 18, wherein a length of the off period is set to be longer when the second battery pack is attached to the energy storage device in comparison to when the second battery pack is detached from the energy storage device.

21. The energy storage device according to claim 1,
   wherein each battery pack further includes a temperature adjuster,
   wherein the temperature adjuster includes temperature sensing means to sense temperature of the battery cell unit and fan driving means to drive a fan based on the sensed temperature so as to control the temperature of the battery cell unit.

* * * * *